(12) United States Patent
Fukawatase et al.

(10) Patent No.: US 7,946,618 B2
(45) Date of Patent: May 24, 2011

(54) AIRBAG DEVICE

(75) Inventors: Osamu Fukawatase, Aichi-ken (JP); Shuji Yamada, Aichi-ken (JP); Yasushi Itou, Toyota (JP); Akiyoshi Sanada, Aichi-ken (JP); Tomotaka Kuroda, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 17 days.

(21) Appl. No.: 12/408,912

(22) Filed: Mar. 23, 2009

(65) Prior Publication Data

US 2009/0236837 A1 Sep. 24, 2009

(30) Foreign Application Priority Data

Mar. 21, 2008 (JP) ................. 2008-073709

(51) Int. Cl.
*B60R 21/30* (2006.01)
(52) U.S. Cl. ....................................................... 280/739
(58) Field of Classification Search ................. 280/739, 280/743.1, 743.2
See application file for complete search history.

(56) References Cited

U.S. PATENT DOCUMENTS

| 6,129,196 | A  | * | 10/2000 | Lapper et al. ................. 198/313 |
| 6,773,027 | B2 | * | 8/2004  | Bohn et al. .................... 280/729 |
| 6,863,304 | B2 | * | 3/2005  | Reiter et al. ................... 280/739 |
| 7,328,915 | B2 | * | 2/2008  | Smith et al. .................... 280/739 |
| 7,635,148 | B2 | * | 12/2009 | Sager ............................. 280/739 |
| 2003/0209895 | A1 | * | 11/2003 | Gu ................................. 280/739 |
| 2004/0090054 | A1 | * | 5/2004  | Bossecker et al. ............ 280/739 |
| 2004/0130135 | A1 |   | 7/2004  | Ekdahl |
| 2009/0230663 | A1 | * | 9/2009  | Mills et al. .................... 280/735 |

FOREIGN PATENT DOCUMENTS

| JP | 07323806 A | 12/1995 |
| JP | 08268213   | 10/1996 |
| JP | 2004155420 | 6/2004  |
| JP | 2004196253 A | 7/2004 |
| JP | 2004231026 A | 8/2004 |
| JP | 2004244006 A | 9/2004 |

* cited by examiner

*Primary Examiner* — Paul N Dickson
*Assistant Examiner* — Robert A Coker
(74) *Attorney, Agent, or Firm* — Gifford, Krass, Sprinkle, Anderson & Citkowski, P.C.

(57) ABSTRACT

An airbag device includes: a bag body that is deployed by internal pressure rising as a gas is supplied into the bag body; and a gas pressure adjustment portion that is provided on the bag body so as to be able to release the gas from the inside of the bag body during a deployed state of the bag body, and that is set so that the amount of the gas released from the bag body in the deployed state to an inward side in a vehicle width direction is larger than the amount of the gas released from the bag body in the deployed state to an outward side in the vehicle width direction.

11 Claims, 17 Drawing Sheets

AIRBAG DEVICE

INCORPORATION BY REFERENCE

The disclosure of Japanese Patent Application No. 2008-073709 filed on Mar. 21, 2008 including the specification, drawings and abstract is incorporated herein by reference in its entirety.

BACKGROUND OF THE INVENTION

1. Field of the Invention

The invention relates to an airbag device that is mounted in a vehicle and that deploys a bag body, for example, in front of an occupant when the vehicle collides with an object.

2. Description of the Related Art

A bag body (airbag) of an airbag device disclosed in Japanese Patent Application Publication No. 2004-155420 (JP-A-2004-155420) is provided with a cylindrical tube vent. The tube vent is provided in a state in which a distal end of the tube vent is located inside of the bag body. The distal end of the tube vent is retained by a clamp or the like so that even when the bag body is inflated and deployed, the state in which the tube vent is located at an inward side in the bag body is maintained. While the tube vent is retained inside the deployed bag body, the tube vent is flattened in a flat shape by the gas pressure and remains so within the bag body.

When the retention of the tube vent by the clamp in the deployed bag body discontinues, the pressure inside of the bag body causes the tube vent stretch out to an outside of the bag body, and the inner pressure of the bag body also inflates the tube vent. In this state, gas in the bag body is released to the outside of the bag body, flowing from a base end of the tube vent to the distal end thereof. This adjusts the gas pressure in the bag body.

In the construction disclosed in Japanese Patent Application Publication No. 2004-155420 (JP-A-2004-155420), as the retention of the tube vent by the clamp discontinues, the tube vent stretches out to the outside of the bag body due to the inner pressure of the bag body. If the tube vent stretches outward in the vehicle width direction, the tube vent is impeded by a pillar, a window pane or the like of the vehicle. The tube vent impeded in this manner by a pillar, a window pane or the like of the vehicle cannot sufficiently stretch, but often bends at an intermediate portion thereof. If the tube vent bends in this manner, the release of gas through the tube cannot smoothly take place.

SUMMARY OF THE INVENTION

It is an object of the invention to provide an airbag device capable of smoothly releasing gas.

An airbag device in accordance with an aspect of the invention includes: a bag body that is deployed by internal pressure rising as a gas is supplied into the bag body; and a gas pressure adjustment portion that is provided on the bag body so as to be able to release the gas from an inside of the bag body during a deployed state of the bag body, and that is set so that amount of the gas released from the bag body in the deployed state to an inward side in a vehicle width direction is larger than the amount of the gas released from the bag body in the deployed state to an outward side in the vehicle width direction.

According to the airbag device in accordance with the foregoing aspect, the bag body is provided with the gas pressure adjustment portion. As the bag body is supplied with the gas, the internal pressure of the bag body rises. When the bag body is deployed by the rising internal pressure, the gas in the bag body is released to the outside of the bag body by the gas pressure adjustment portion. Thus, the internal pressure of the bag body in the deployed state is adjusted.

It is to be noted that the gas pressure adjustment portion is set so that the amount of the gas released from the bag body in the deployed state to the inward side in the vehicle width direction is larger than the amount of the gas released from the bag body in the deployed state to the outward side in the vehicle width direction. Therefore, when the gas is released via the gas pressure adjustment portion, the influence of a pillar or the like of the vehicle that is positioned outwardly of the bag body in the vehicle width direction.

In the foregoing aspect of the invention, it suffices that the amount of the gas released at the gas pressure adjustment portion be larger from the bag body in the deployed state to the inward side in the vehicle width direction than from the bag body in the deployed state to the outward side in the vehicle width direction. Therefore, even in a construction in which the gas is released from both sides of the bag body in the deployed state in the vehicle width direction, it naturally suffices that the release of the gas from the bag body to the outward side in the vehicle width direction be more restrained than the release of the gas from the bag body to the inward side in the vehicle width direction. Besides, a construction in which the gas is not released at all from the bag body in the deployed state to the outward side in the vehicle width direction is also permissible.

As described above, the airbag device in accordance with the foregoing aspect of the invention is able to eliminate or very effectively reduce the influence received from a vehicle body, such as a pillar or the like, when the internal pressure of the bag body is adjusted by releasing the gas from the deployed bag body. Therefore, the release of the gas can be smoothly performed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Construction of First Embodiment

Figure 1:
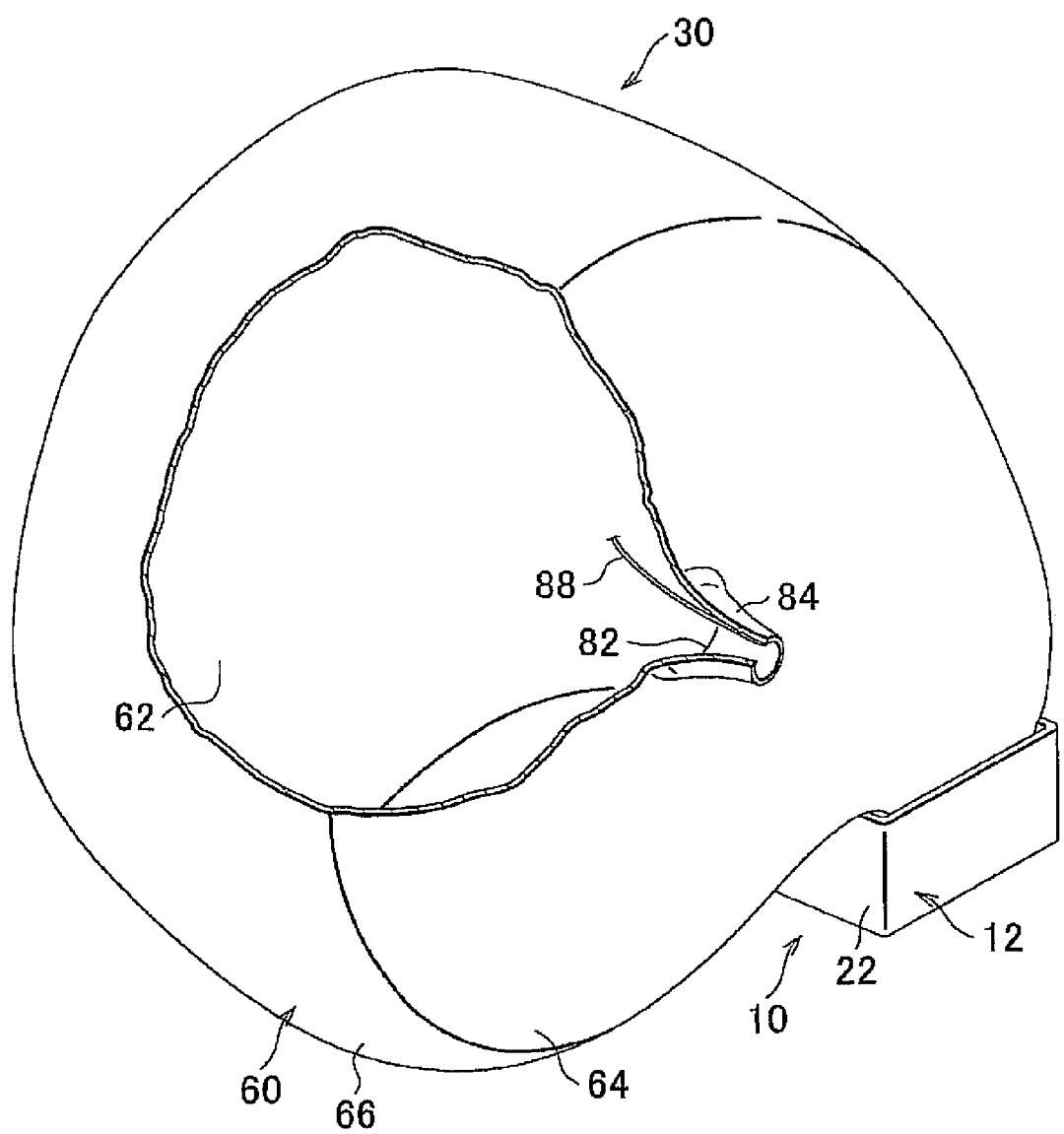
FIG. 1 is a perspective view of an airbag device in accordance with an first embodiment of the invention.
Figure 5:
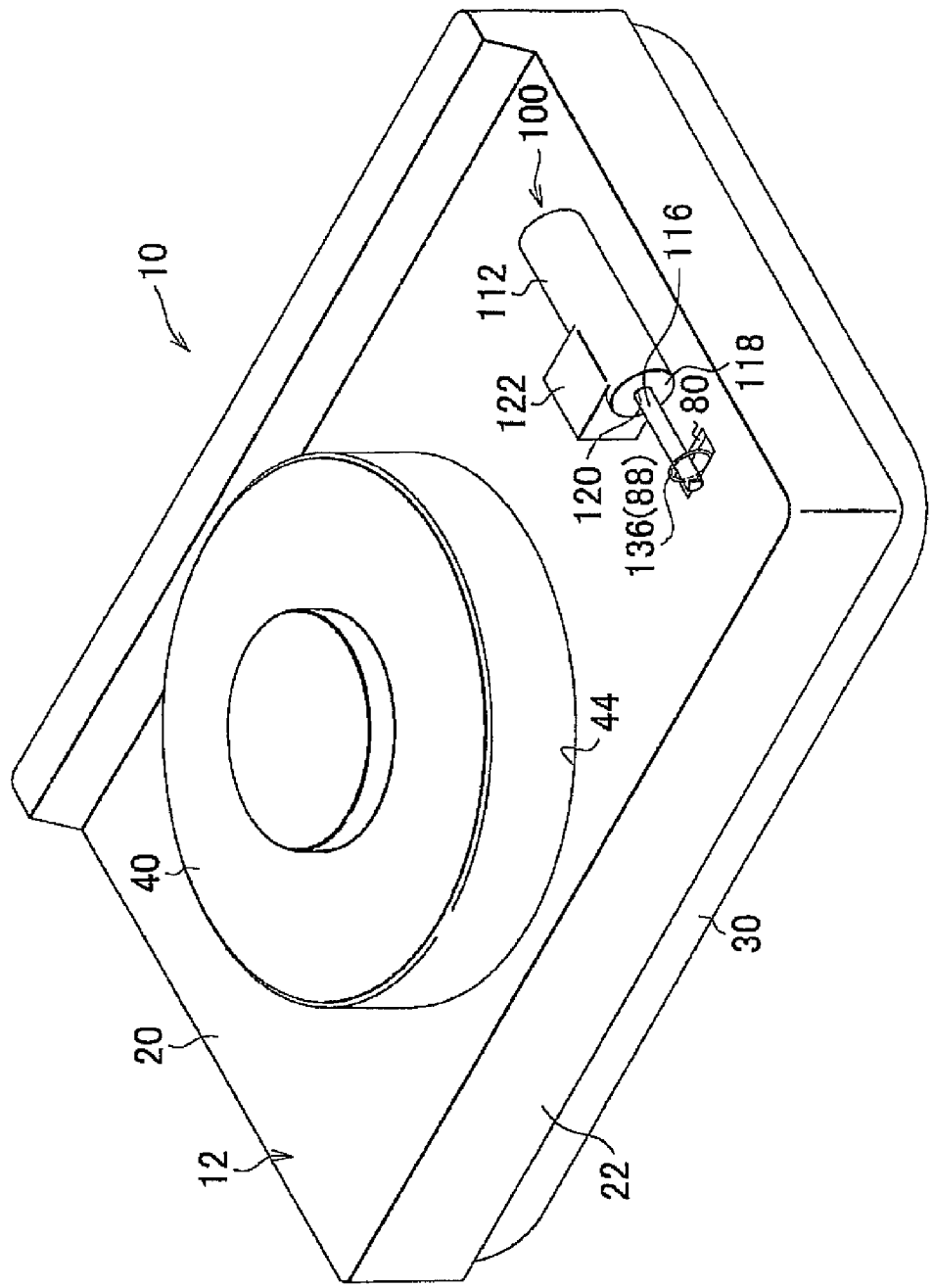
FIG. 5 is a perspective view of the airbag device in accordance with the first embodiment of the invention with the bag body being in a folded state, which is viewed from a reverse surface side of the device.

FIG. 1 shows portions of an airbag device 10 in accordance with a first embodiment of the invention, in a perspective view. FIG. 5 shows a perspective view of the airbag device 10 taken from a reverse side thereof (it is to be noted that FIG. 1 shows a deployed state of a bag body 30 described below, and FIG. 5 shows a folded state of the bag body 30).

Figure 2:
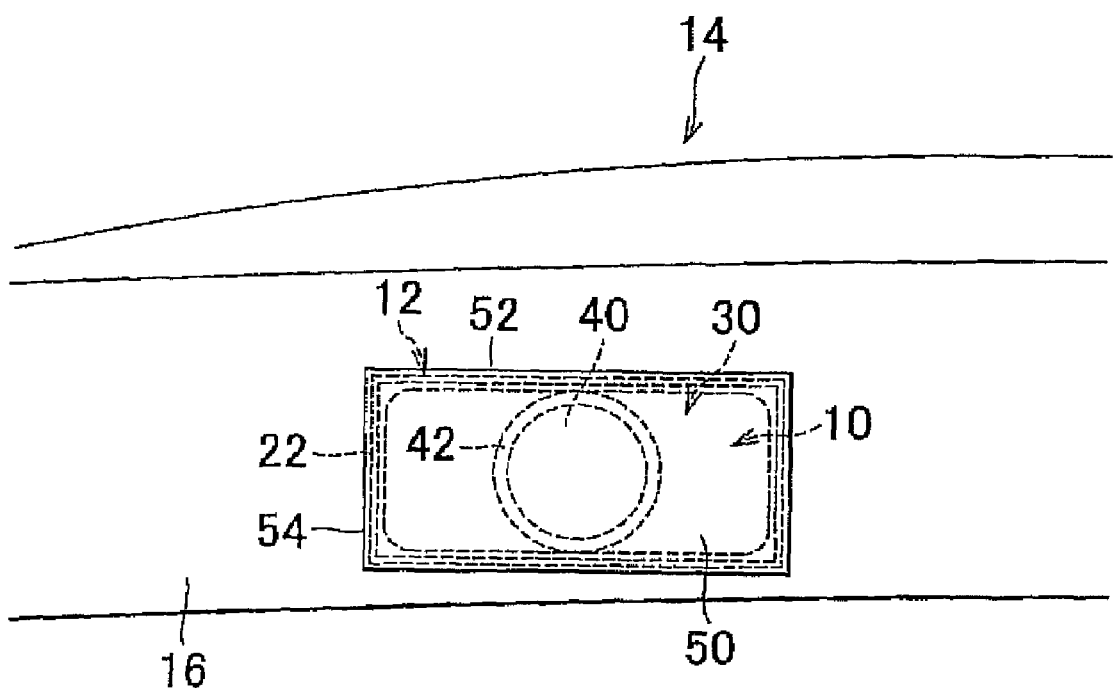
FIG. 2 is a plan view of an airbag device installation site in a vehicle cabin when the airbag device in accordance with the first embodiment of the invention is not activated.

As shown in these drawings, the airbag device 10 has a base plate 12. As shown in FIG. 2, if the airbag device 10 is a device for a passenger's seat of a vehicle 14, the airbag device 10 is fixed to a vehicle body structure member, such as a reinforcement or the like, at a reverse surface side of an instrument panel 16 of the vehicle 14. Besides, if the airbag device 10 is a device for the driver's seat of the vehicle 14, although not illustrated in particular detail, the base plate 12 is disposed at an inner side of a rim that constitutes the steering wheel, and is fixed to spokes of the steering wheel, or the like.

The base plate 12 has a bottom wall 20 of a generally rectangular shape in a plan view. A peripheral wall 22 stands upward (downward in FIG. 5) from an outer peripheral portion of the bottom wall 20. Besides, the base plate 12 is provided with a bag body 30 in a folded state. An opening end of the bag body 30 is fixed to the bottom wall 20 on an inner side of the peripheral wall 22 by a bracket or the like. Besides, the base plate 12 is provided with an inflator 40. A main body portion of the inflator 40 has a generally disc shape, or a generally cylindrical shape with a relatively short dimension in the direction of the axis.

Figure 3:
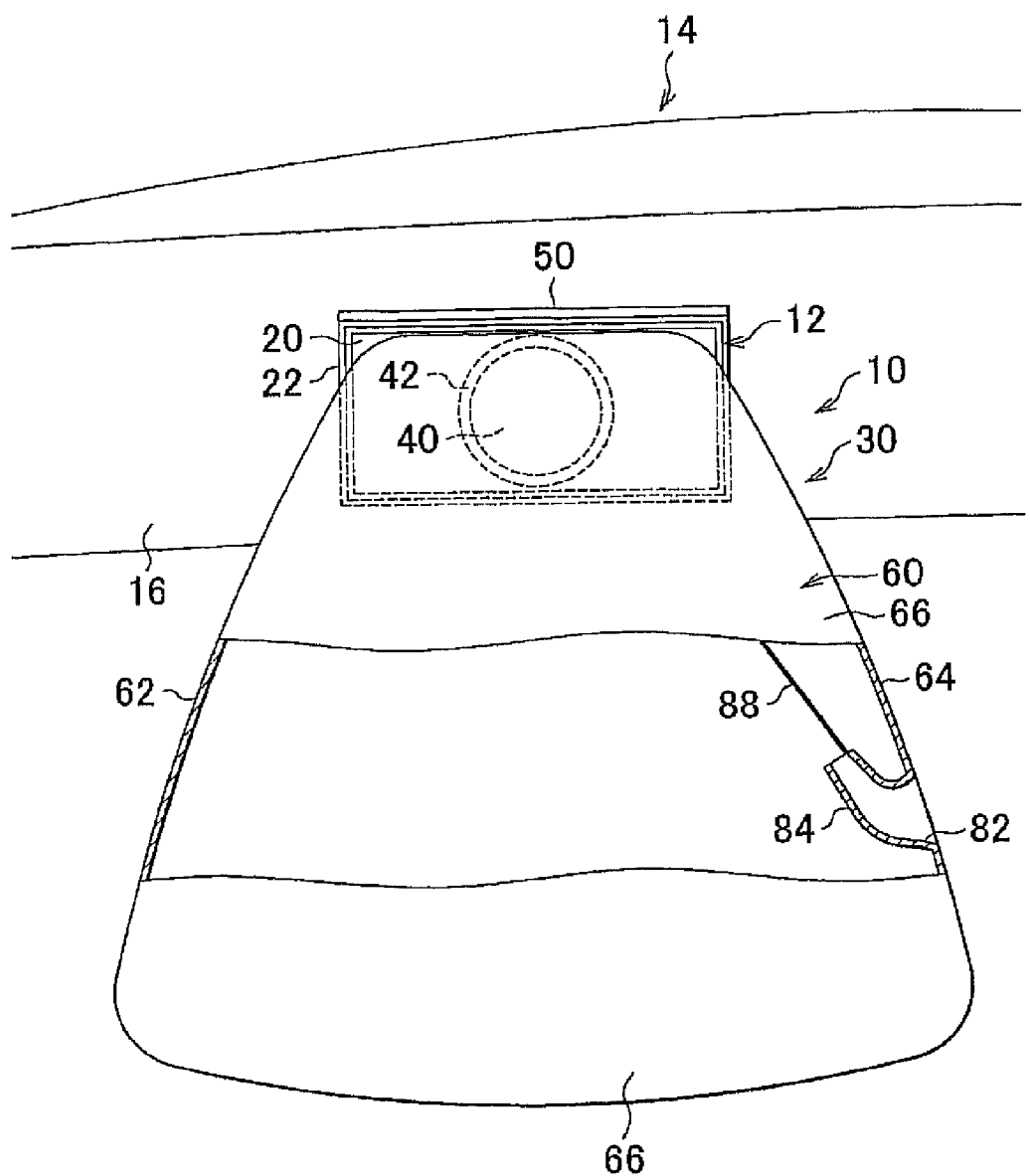
FIG. 3 is a plan view corresponding to FIG. 2, showing a state in which a bag body has deployed with a distal end of a tube vent continuing to be retained.
Figure 4:
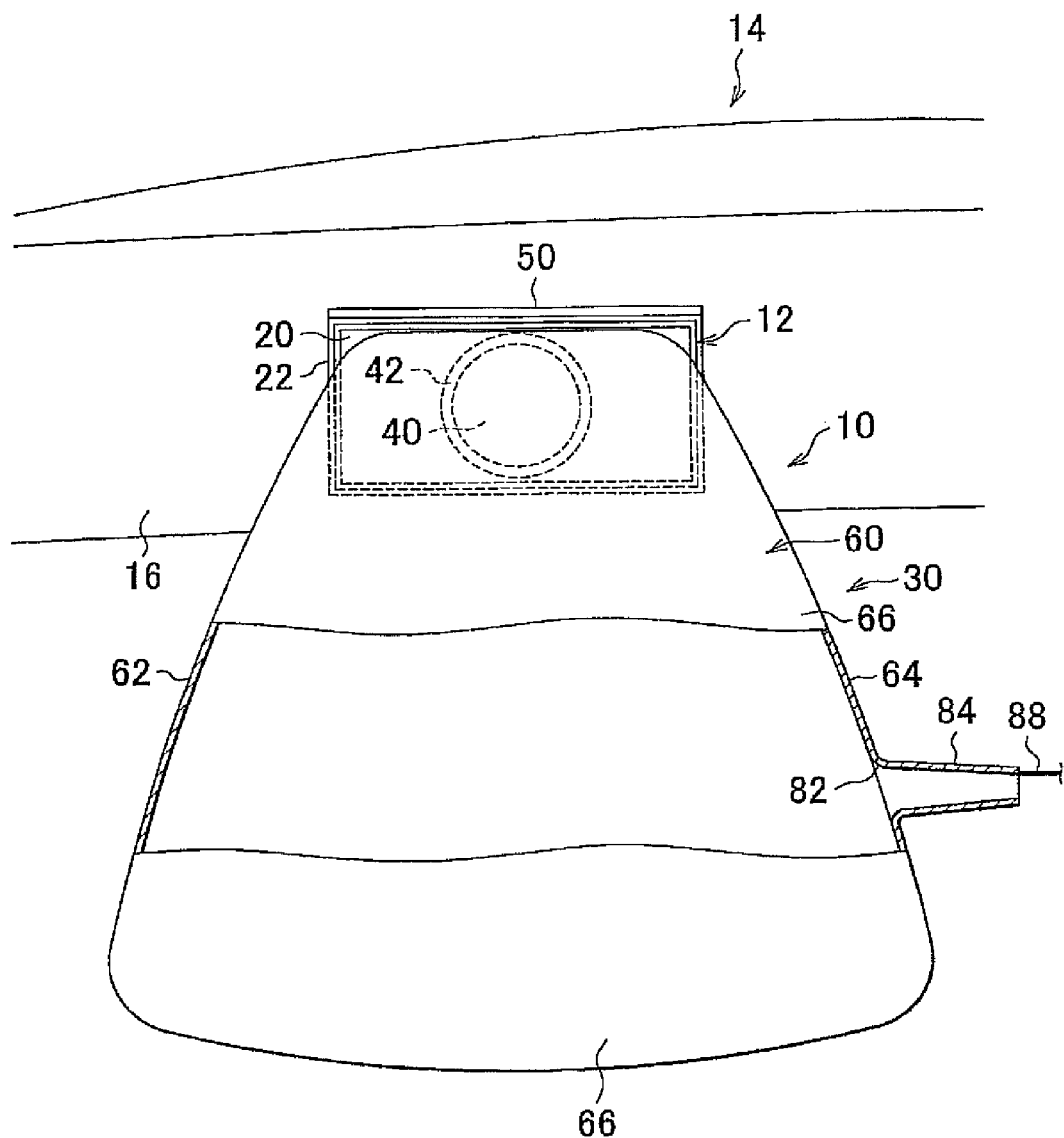
FIG. 4 is a plan view corresponding to FIG. 2, showing a state in which the retention of the distal end of the tube vent has discontinued and the tube vent has stretched out to an outside of the bag body.

A flange portion 42 shown in FIGS. 2 to 4 (not shown in FIG. 5) is formed on an intermediate portion of the main body portion of the inflator 40 in the direction of the axis. Furthermore, a lower-side portion (shown as an upper-side portion in FIG. 5) of the main body portion of the inflator 40 that is below the flange portion 42 penetrates a circular hole 44 that is formed in the bottom wall 20. The inflator 40, partially penetrating the circular hole 44 in this manner, is fixed to the bottom wall 20, with the flange portion 42 of the inflator 40 being in contact with an upper surface of the bottom wall 20, and with a space between the circular hole 44 and the inflator 40 being sealed.

The inflator 40, mounted on the base plate 12 in this manner, is positioned at the inner side of the opening end of the bag body 30 disposed in the folded state. When activated, the inflator 40 instantaneously generates a gas, and releases the generated gas to the outside of the inflator 40 at an upper side above the bottom wall 20. The gas released from the inflator 40 in this manner inflates the bag body 30 by its pressure.

As shown in FIG. 2, an airbag door 50 is formed in the instrument panel 16 of the vehicle 14, corresponding to the airbag device 10. An outer peripheral shape of the airbag door 50 is a rectangle in a plan view that is larger than the outer peripheral shape of the peripheral wall 22 (i.e., the base plate 12). A hinge portion 52 is formed at the boundary between an front side of the airbag door 50 and a portion of the instrument panel 16 that excludes the airbag door 50. A portion of the instrument panel 16 defined as the hinge portion 52 is thinner in wall thickness than the portion of the instrument panel 16 that excludes the hinge portion 52, so that the hinge portion 52 is weaker in mechanical strength than the portion of the instrument panel 16 that excludes the hinge portion 52.

A rupturable portion 54 is formed at a boundary between right and left sides and a rear side of the airbag door 50 and the portion of the instrument panel 16 that excludes the airbag door 50. A portion of the instrument panel 16 defined as the rupturable portion 54 is even thinner in wall thickness than the portion of the instrument panel 16 defined as the hinge portion 52. Therefore, the rupturable portion 54 is even weaker in mechanical strength than the hinge portion 52.

When the bag body 30 inflating due to the pressure of the gas supplied from the inflator 40 presses the airbag door 50 from the reverse surface side of the instrument panel 16, rapture occurs in the instrument panel 16 at the rupturable portion 54, and then the airbag door 50 pivots about the hinge portion 52. As a result, the instrument panel 16 is opened at a position where the airbag door 50 is disposed, so that the inflating bag body 30 can deploy to a cabin inner side in the vehicle 14.

On the other hand, the bag body 30 has a bag main body 60 as shown in FIG. 1. The bag main body 60 has a side base cloth 62 whose external surface substantially faces an outward side in the width direction of the vehicle 14 during a deployed state of the bag body 30, and a side base cloth 64 that substantially faces an inward side in the width direction of the vehicle 14 during the deployed state. An outer peripheral portion of the side base cloth 62 and an outer peripheral portion of the other side base cloth 64 are interconnected by an outer peripheral base cloth 66, except for portions of the side base cloths that correspond to the opening end of the bag body 30. Thus, the bag main body 60 is formed in a bag shape as a whole.

Besides, as shown in FIGS. 1, 3 and 4, the side base cloth 64 whose external surface faces inward in the width direction of the vehicle 14 during the deployed state of the bag body 30 as described above is provided with a hole portion 82. Corresponding to the hole portion 82, a cylindrical tube vent 84 as a gas pressure adjustment portion is provided in the side base cloth 64. That is, only the side base cloth 64 positioned inward in the vehicle width direction is provided with the hole portion 82 and the tube vent 84, and the side base cloth 62 positioned outward in the vehicle width direction is not provided with the hole portion 82 or the tube vent 84. In this embodiment, the tube vent 84 is open at both ends thereof, and is formed so as to taper from a base end to a distal end of the tube vent 84 in a deployed state. A base end portion of the tube vent 84 (a base end opening of the tube vent 84) connects to a peripheral edge of the hole portion 82. Thus, the tube vent 84 and the interior of the bag main body 60 communicate with each other, via the hole portion 82.

A base end portion of a tether 88 is latched to a distal end of the tube vent 84. The tether 88 has flexibility and is formed in an elongated string shape or an elongated thin-width band. A distal end portion of the tether 88 extends inside the bag main body 60, and passes through a small hole 80 formed in the base plate 12, and extends to the outside of the base plate 12.

Figure 6:
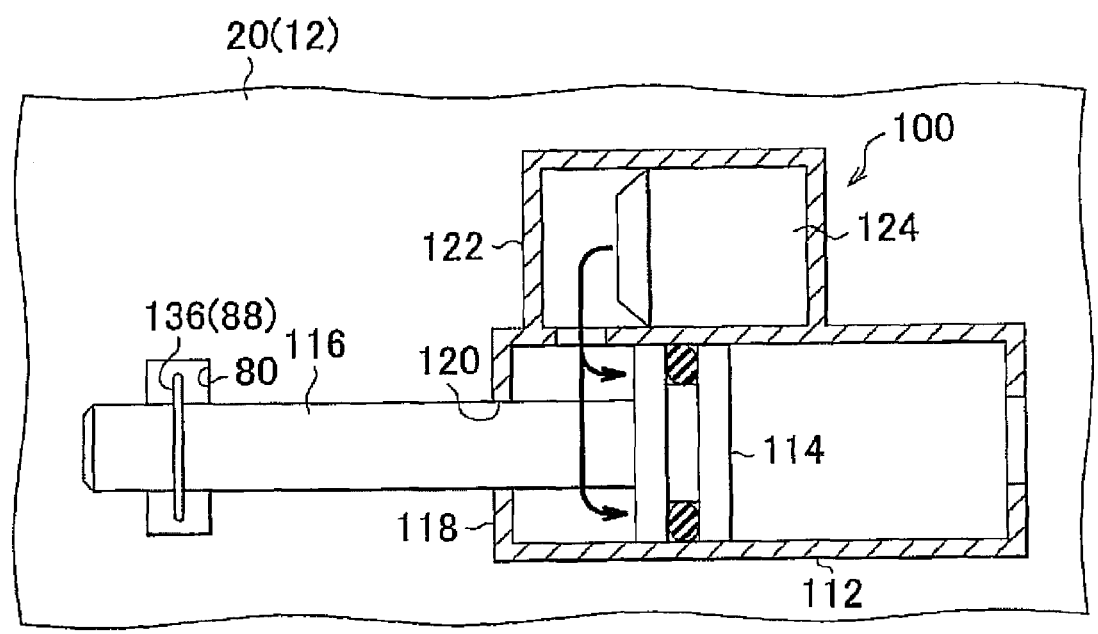
FIG. 6 is a sectional view showing a construction of a retention device.

As shown in FIG. 5, a tether retention device 100 as a retention device is provided on the reverse surface of the bottom wall 20 that constitutes the base plate 12. As shown in FIG. 6, the tether retention device 100 has a micro gas generator 122. As shown in FIGS. 5 and 6, the cylinder 112 is formed in a cylindrical shape whose axis is substantially parallel to the reverse surface of the base plate 12. As shown in FIG. 6, inside the cylinder 112, a piston 114 is disposed slidably along the axis of the cylinder 112.

A base end portion of a bar-shape retention rod 116 is integrally linked to an end of the piston 114, coaxially with the piston 114. A distal end of the retention rod 116 extends through a through-hole 120 that is formed in a wall portion 118 of the cylinder 112 that closes an end of the cylinder 112 in the axis direction thereof, and is protruded into the outside of the cylinder 112. A portion of the retention rod 116 protruded into the outside of the cylinder 112 that is near the distal end thereof passes over the aforementioned small hole 80, and a distal end portion of the retention rod 116 passes through an annular latch ring 136 that is formed on a distal end of the tether 88 that is passed through the small hole 80. Thus, due to the penetration of the distal end portion of the retention rod 116 through the latch ring 136, the tether 88 is restricted from passing through the small hole 80 to the inner side of the base plate 12.

Besides, as shown in FIG. 5, the tether retention device 100 has a gas generation portion 122. The gas generation portion 122 is formed integrally with the cylinder 112, on a side of the cylinder 112 that is along a direction orthogonal to the direction of the axis of the cylinder 112. As shown in FIG. 6, a micro gas generator 124 as a gas generator is provided inside the gas generation portion 122. The micro gas generator 124 has a gas-generating agent that instantaneously generates a gas when burning, and an ignition device that ignites the gas-generating agent on the basis of an ignition signal from a control portion such as an airbag ECU (not shown) or the like.

Figure 8:
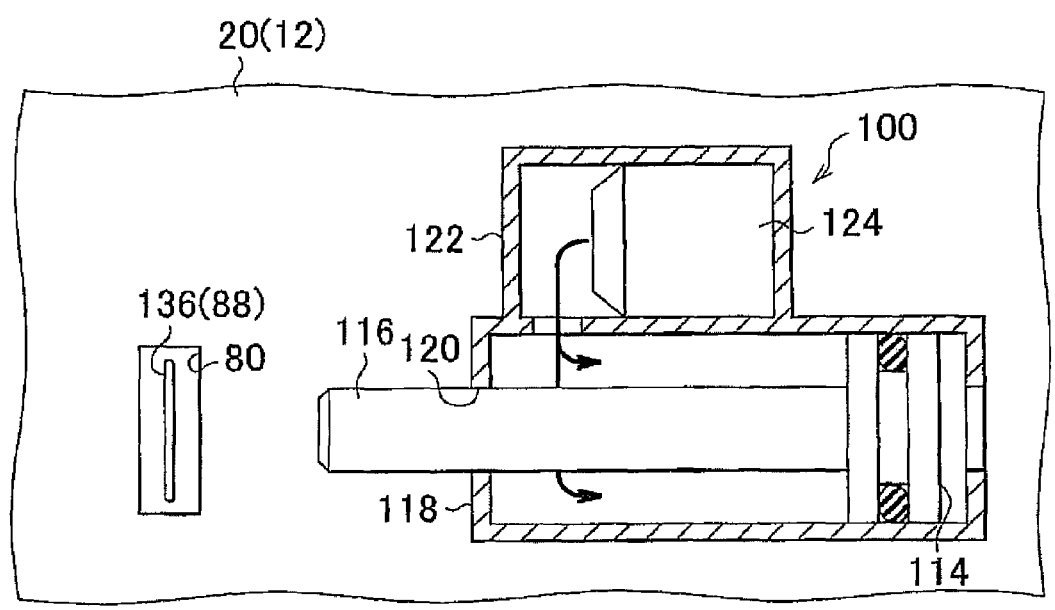
FIG. 8 is a sectional view corresponding to FIG. 6, showing a state in which the retention device has activated.

The gas generation portion 122 is linked to the cylinder 112 in the vicinity of an end portion of the cylinder 112 in the axis direction thereof so that the gas generated as the gas-generating agent of the micro gas generator 124 burns is supplied to a space between the wall portion 118 of the cylinder 112 and the piston 114. Therefore, when the gas is supplied to the cylinder 112 as the micro gas generator 124 activates, the internal pressure of the cylinder 112 between the wall portion 118 and the piston 114 rises so that the piston 114 slides toward the other end of the cylinder 112 (i.e., toward a side opposite to the wall portion 118) as shown in FIG. 8. Therefore, the retention rod 116 is drawn into the cylinder 112, with a base end thereof leading the entry into the cylinder 112, so that the retention rod 116 leaves a space over the small hole 80. As the retention rod 116 leaves the space over the small hole 80 in this manner, the retention rod 116 moves out of the latch ring 136 of the tether 88. Thus, the retention of the tether 88 by the retention rod 116 discontinues, so that the tether 88 can pass through the small hole 80 into the inside of the base plate 12.

Operation and Effects of First Embodiment

Next, operation and effects of this embodiment will be described.

In this airbag device 10, when a vehicle state detection sensor, such as an acceleration sensor or the like, detects that the vehicle has entered a sharp deceleration state and a detection signal output from the detection sensor is input to a control portion such as the airbag ECU or the like, the ignition device (not shown) provided for the inflator 40 is activated. When the ignition device of the inflator 40 activates, the gas-generating agent in the inflator 40 is caused to burn by the ignition device. When the gas-generating agent burns, a large amount of gas is generated instantaneously.

The gas thus generated in the inflator 40 is released out of the inflator 40 at a side that is above the bottom wall 20. Since the inflator 40 is provided inside the opening end of the bag body 30, the gas released from the inflator 40 is fed into the bag body 30. As the gas is fed into the bag body 30, the bag body 30 inflates. The inflated bag body 30 presses the airbag door 50 from the reverse side of the instrument panel 16. As the airbag door 50 is pressed by the bag body 30, the rupturable portion 54 of the instrument panel 16 ruptures, so that the airbag door 50 is pivoted about the hinge portion 52 serving as an axis. When a rectangular hole is thus formed in the instrument panel 16, the inflated bag body 30 is deployed, as shown in FIG. 3, from the rectangular hole into a space in front of the seat that corresponds to the airbag device 10, in the cabin of the vehicle.

Thus, as the occupant of a seat that corresponds to the airbag device 10 moves toward a front side of the vehicle 14 by inertia at the time of sharp deceleration of the vehicle while the bag body 30 is in a deployed state in the cabin of the vehicle 14, the deployed bag body 30 receives the occupant's body.

During the process of inflation and deployment of the bag body 30, the hole portion 82 moves away from the base plate 12, as described above. As the hole portion 82 moves away from the base plate 12 in this manner, the tether 88 whose distal end is retained by the retention rod 116 of the tether retention device 100 and whose base end is positioned near the hole portion 82 is stretched. As the bag body 30 is further inflated so that the hole portion 82 moves away from the base plate 12 while the tether 88 is in a stretched state, the tether 88 pulls the distal end of the tube vent 84 as shown in FIG. 3. Therefore, when the bag body 30 is inflated to a deployed state in the cabin of the vehicle 14, the tube vent 84 is pulled by the tether 88 so that the distal end portion of the tube vent 84 stretches from its base end portion to an inward side within the bag main body 60, and this state is retained.

Herein, if it is determined that the body size of the occupant sitting in the seat is not small on the basis of a signal from an occupant's body size detection sensor, for example, a load sensor provided in the seat, or the like, the micro gas generator 124 is not activated, so that the retention rod 116 remains extending through the latch ring 136 of the tether 88. Therefore, the tube vent 84 is pulled by the tether 88, and is retained thereby in a state in which the distal end portion thereof is stretched from the base end portion thereof to the inward side within the bag main body 60.

During this state, the tube vent 84 is flattened or pressed by the internal pressure in the bag main body 60, thus restraining gas leakage from the inside of the bag body 30 to the outside of the bag body 30 via the tube vent 84. Therefore, the internal pressure of the bag body 30 can be maintained during the deployed state of the bag body 30, so that the deployed bag body 30 can effectively receive a relatively large-size occupant's body.

On the other hand, if it is determined that the body size of the occupant sitting in the seat is small on the basis of a signal from the occupant's body size detection sensor, for example, a load sensor provided in the seat, or the like, an ignition signal is output to the ignition device of the micro gas generator 124 as well when an ignition signal is output to the ignition device of the inflator 40 from the control portion, such as the airbag ECU or the like, as mentioned above. As the ignition device of the micro gas generator 124 activates, the gas-generating agent in the micro gas generator 124 burns generating gas in the cylinder 124. As a result, the gas generated in the gas generation portion 122 is supplied to the space between the piston 114 and the wall portion 118 of the cylinder 112. Therefore, the internal pressure of the cylinder 124 between the wall portion 118 and the piston 114 rises, so that the piston slides to the other end of the cylinder 112, as shown in FIG. 8.

Figure 7:
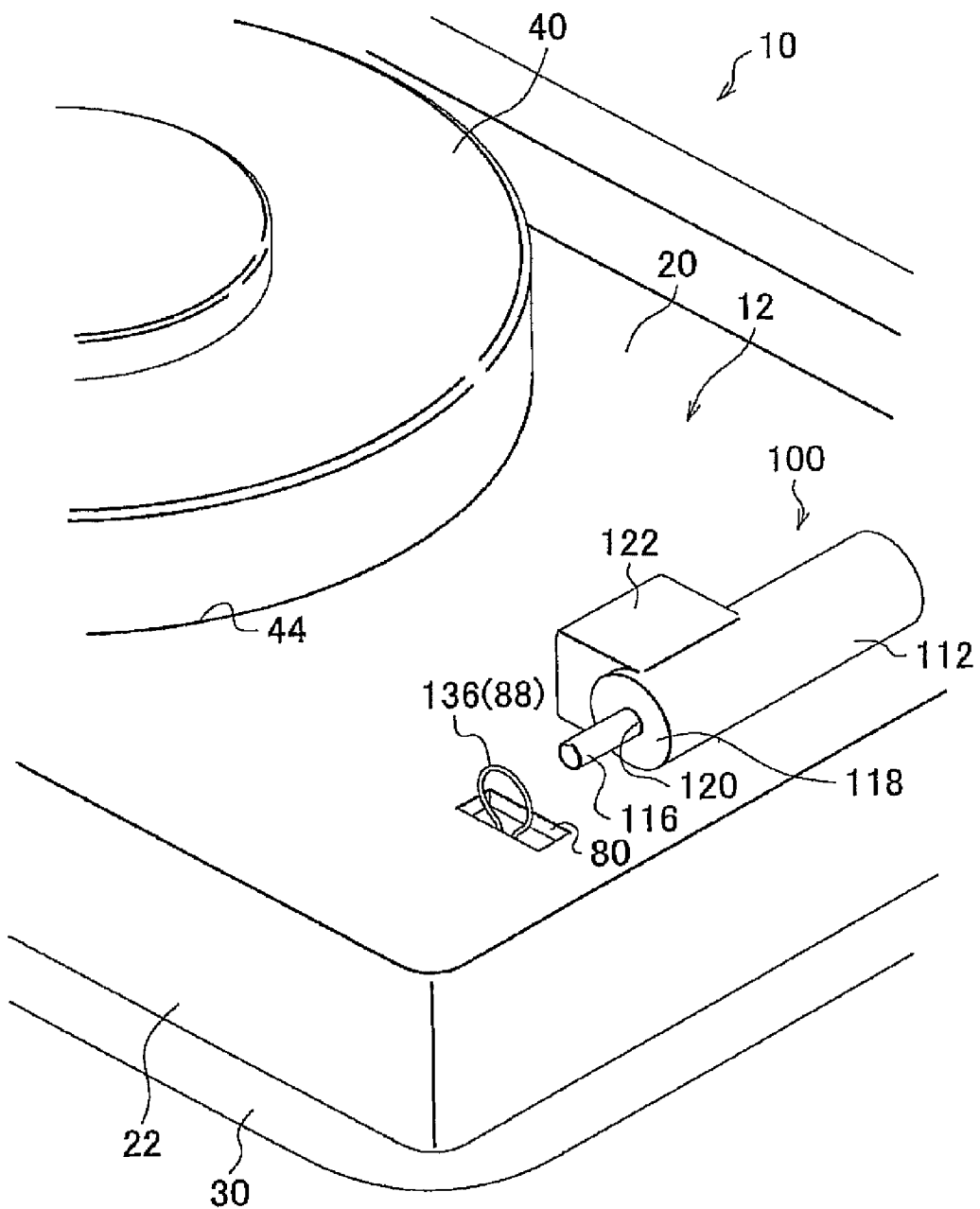
FIG. 7 is an enlarged perspective view of the construction of the retention device.

Due to the sliding movement of the piston 114, the retention rod 116 is drawn into the cylinder 112, with the base end of the retention rod 116 leading the entry thereinto, so that the retention rod 116 moves out of the latch ring 136, as shown in FIG. 7. As the retention rod 116 moves out of the latch ring 136 in this manner, the retention of the tether 88 by the retention rod 116 discontinues. Then, as the bag body 30 inflates from this state, the internal pressure of the bag body 30 forces the tube vent 84 out of the hole portion 82. As a result, as the tube vent 84 shifts to the outside of the bag main body 60 through the hole portion 82, the tube vent 84 turns inside out, starting with the base end thereof.

When the tube vent 84 entirely stretches straight out to an outside of the bag main body 60 as shown in FIG. 4 through the progressive inside-out turning of the tube vent 84 that starts from the base end, gas in the bag body 30 flows from the hole portion 82 into the tube vent 84, and the pressure of the gas inflates the tube vent 84, so that the distal end portion of the tube vent 84 becomes open. As a result, the inside and the outside of the bag main body 60 are interlinked via the tube vent 84, and gas in the bag body 30 is released to the outside of the bag body 30. Since the release of gas from the inside of the bag body 30 reduces the internal pressure of the bag body 30 in this manner, the bag body 30 has reached a reduced tension state when the bag body 30 receives an occupant of a relatively small body size.

In this airbag device 10, the hole portion 82 is formed in the side base cloth 64 whose external surface faces inward in the width direction of the vehicle 14 during the deployed state of the bag body 30, and the base end portion of the tube vent 84 connects to a peripheral edge of the hole portion 82 (i.e., the tube vent 84 is provided on the side base cloth 64 whose external surface faces inward in the width direction of the vehicle 14 during the deployed state of the bag body 30). On the other hand, the side base cloth 62 whose external surface faces outward in the width direction of the vehicle 14 during the deployed state of the bag body 30 does not have the hole portion 82, and is not provided with the tube vent 84 either.

Therefore, even though the tube vent 84 stretches out to the outside of the bag body 30, the tube vent 84 is not impeded by a window pane of the vehicle 14 provided at an outward side of the bag body 30 in the vehicle width direction during the inflated state, the front pillar constituting a vehicle body, or the like. As a result, the gas from the bag body 30 sufficiently stretches and inflates the tube vent 84 to the outside of the bag body 30, so that the gas can be smoothly released from the tube vent 84.

The foregoing embodiment has a construction in which since the retention rod 116 extends through the latch ring 136 of the tether 88, the distal end of the tether 88 is retained by the retention rod 116, and in which the retention of the distal end of the tether 88 discontinues as the retention rod 116 moves out of the latch ring 136. However, this manner of construction does not limit the construction for the retention of the distal end of the tether 88 and for the discontinuation of the retention in the invention. For example, it is also permissible to adopt a construction in which the distal end of the tether 88 is pulled out to the reverse surface side of the base plate 12, and is fixed to the base plate 12 or the like, and in which the retention of the tether 88 by the retention rod 116 is discontinued by cutting the tether 88 with an edged tool (cutter) that slides as the micro gas generator 124 activates.

Construction of Second Embodiment

Other embodiments of the invention will be described below. Incidentally, in the description of embodiments below, substantially the same sites and the like of an embodiment as those in any embodiment that is described prior to that embodiment, including the foregoing first embodiment, are presented with the same reference characters, and detailed descriptions thereof are omitted.

Figure 9:
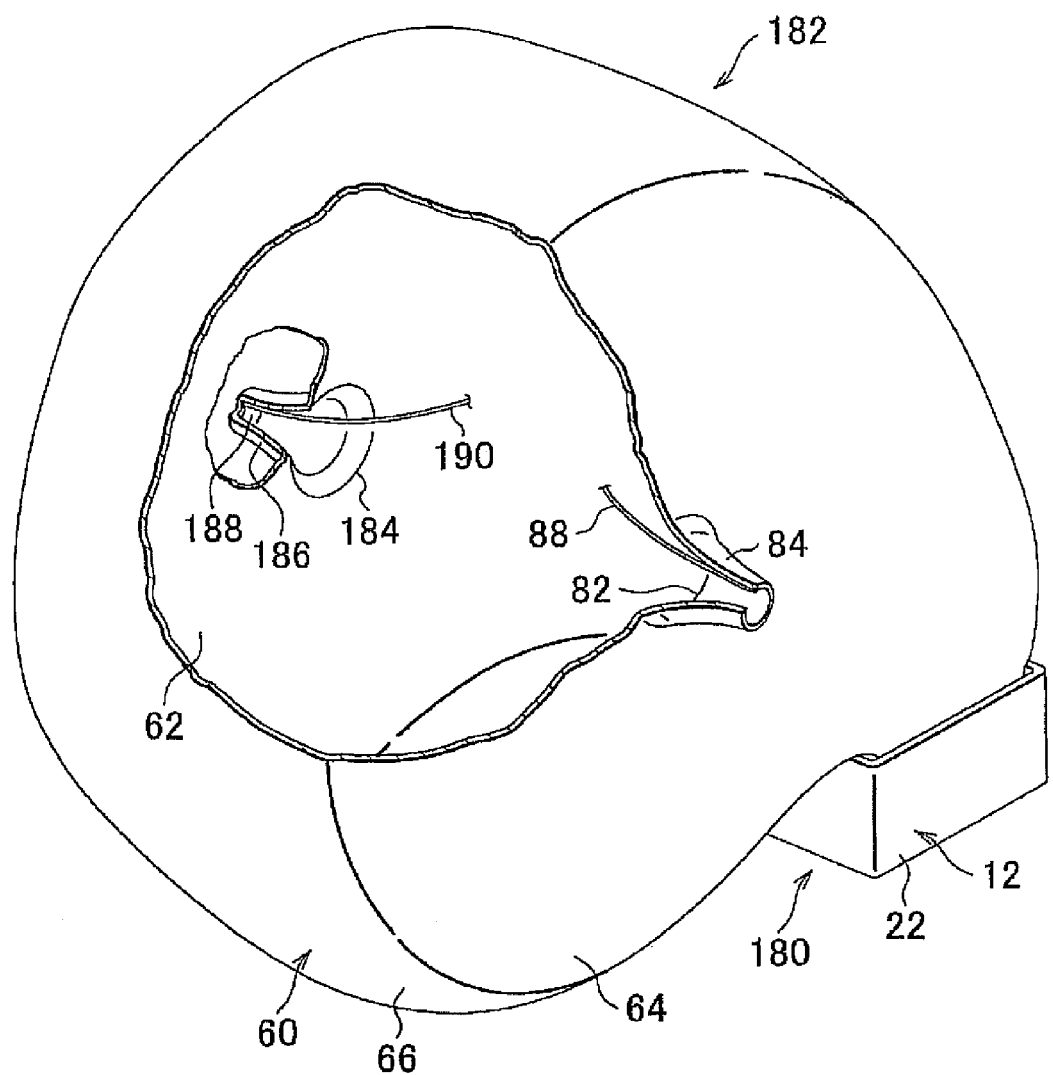
FIG. 9 is a perspective view of an airbag device in accordance with a second embodiment of the invention.

FIG. 9 shows portions of an airbag device 180 in accordance with a second embodiment of the invention, in a perspective view corresponding to the drawing in FIG. 1 that illustrates the airbag device 10 in accordance with the first embodiment.

As shown in FIG. 9, this airbag device 180 is not equipped with the bag body 30, but is equipped with a bag body 182 instead. The bag body 182 is provided with a bag main body 60 that is made up of side base cloths 62, 64 and an outer peripheral base cloth 66. The side base cloth 62 positioned outward in the vehicle width direction of the bag body 182 of the airbag device 180 has a hole portion 184. The hole portion 184 is formed at a position that faces the hole portion 82 of the side base cloth 64 in the vehicle width direction during the deployed state of the bag body 182. Besides, the opening shape of the hole portion 184 is the same as that of the hole portion 82. Corresponding to the hole portion 184, a cylindrical dummy tube vent 186 is provided on the side base cloth 62.

In this embodiment, the dummy tube vent 186 has a cylindrical shape whose base end portion is open. The shape of the dummy tube vent 186 viewed from a direction orthogonal to the lengthwise direction of the dummy tube vent 16 is basically the same as the shape of the tube vent 84 viewed from such a direction. A peripheral edge of the base end portion of the dummy tube vent 186 is connected to the side base cloth 62, at the position of the hole portion 184 thereof. However, unlike the tube vent 84 being open at its both ends, a distal end of the dummy tube vent 186 has a bottom portion 188 that closes the distal end of the dummy tube vent 186.

Figure 12:
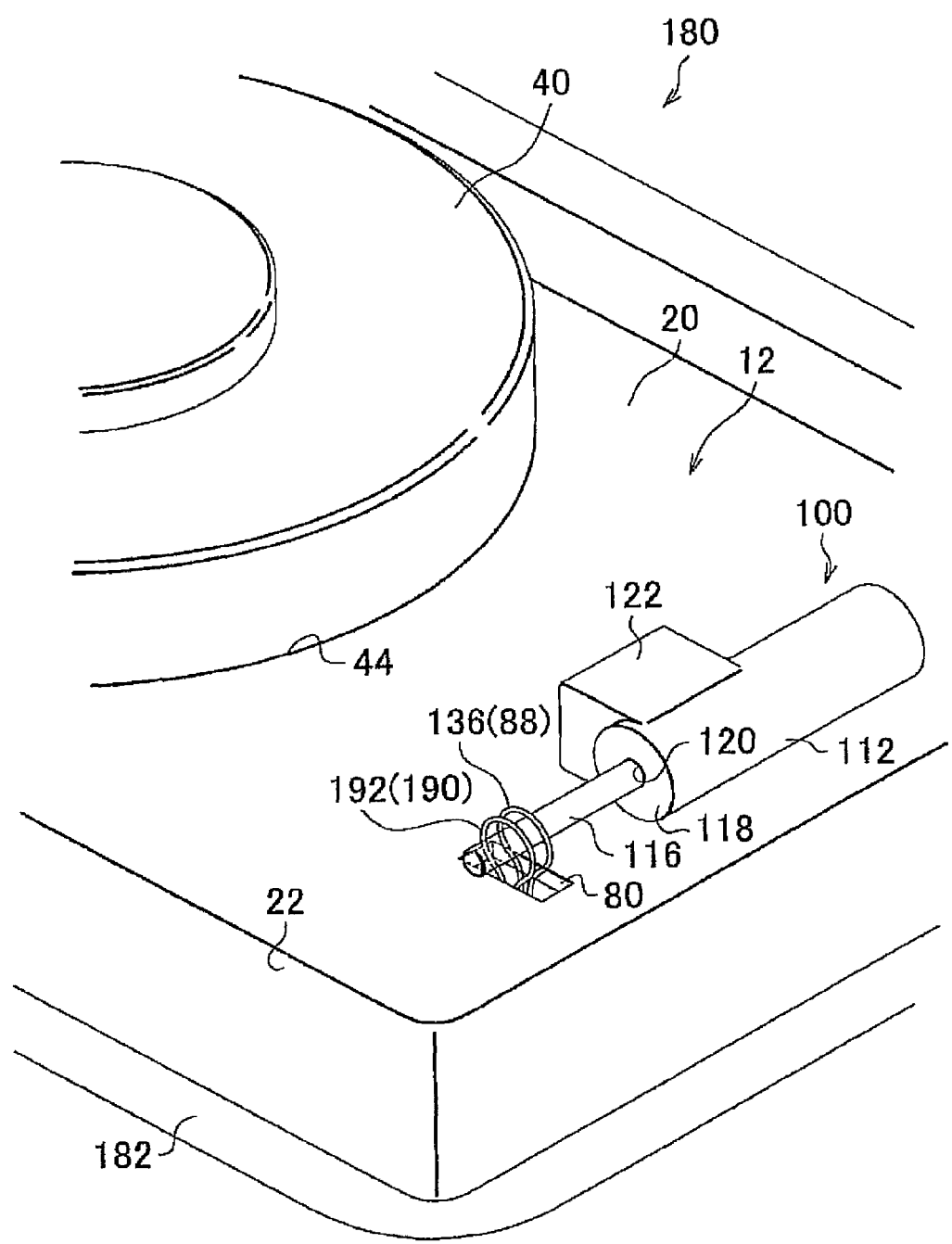
FIG. 12 is an enlarged perspective view of the airbag device in accordance with the second embodiment of the invention with the bag body being in a folded state, which is viewed from a reverse surface of the device.

Besides, a base end portion of a tether 190 is latched to the bottom portion 188, inside the dummy tube vent 186. The tether 190 has flexibility and is formed in an elongated string shape or an elongated thin-width band. A distal end portion of the tether 190 extends inside the bag main body 60, passes through a small hole 80 formed in a base plate 12, and extends to the outside of the base plate 12. As shown in FIG. 12, a latch ring 192 is formed on the distal end of the tether 190. A retention rod 116 penetrating a latch ring 136 of the tether 88 also penetrates the latch ring 192.

Operation and Effects of Second Embodiment

Next, operation and effects of this embodiment will be described.

Figure 10:
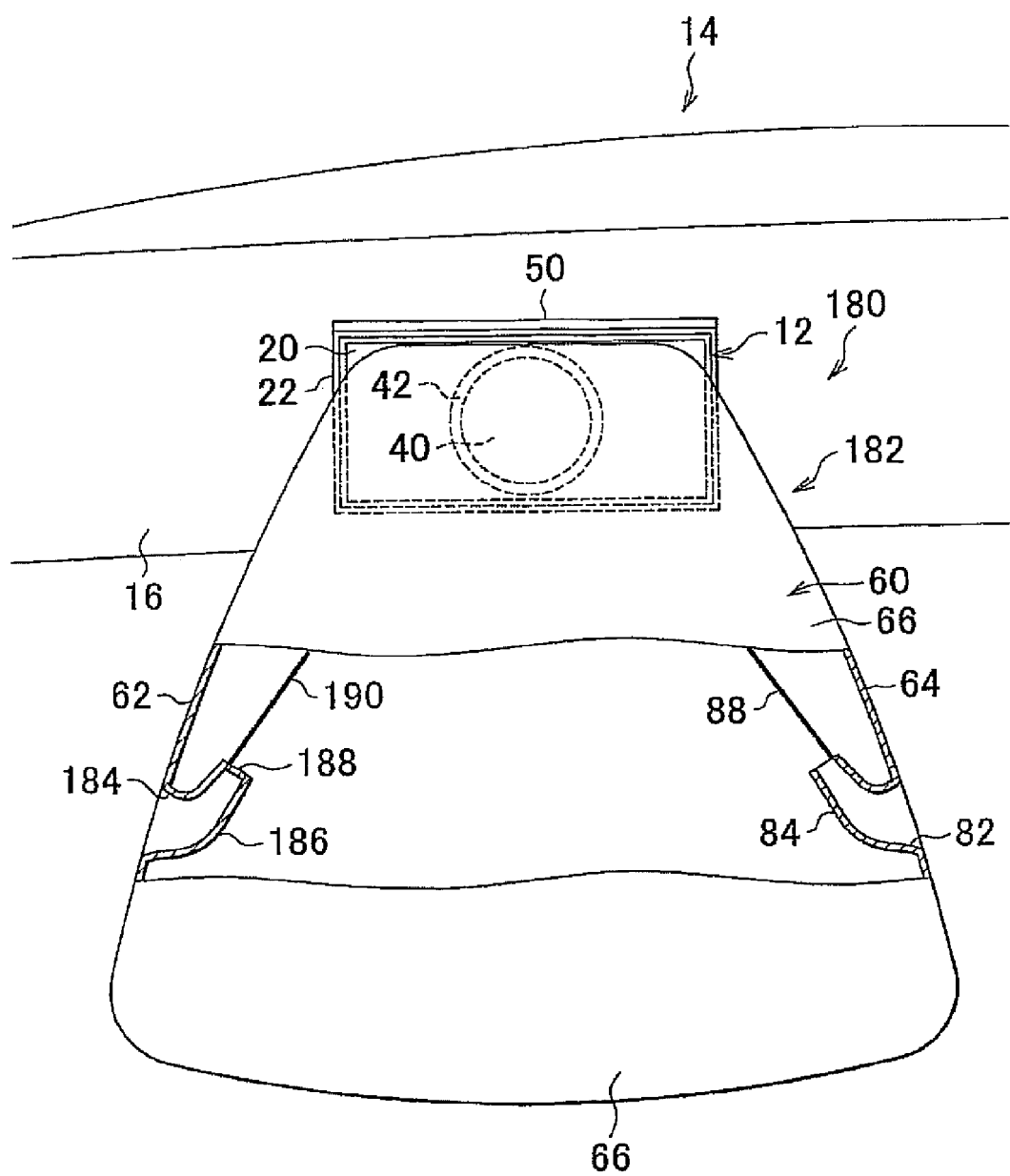
FIG. 10 is a plan view corresponding to FIG. 3, showing a state in which a bag body has deployed, with the distal end of a tube vent continuing to be retained.

In this airbag device 180, the hole portion 82 and the hole portion 184 move away from the base plate 12, during the process of inflation and deployment of the bag body 30. Therefore, the tether 88 and the tether 190 are stretched. Therefore, as shown in FIG. 10, during a state in which the tube vent 84 is pulled and retained by the tether 88 so that the distal end portion of the tube vent 84 stretches from its base end portion to the inward side in the bag main body 60, the dummy tube vent 186 is pulled and retained by the tether 190 so that the distal end portion of the dummy tube vent 186 stretches from its base end portion to the inward side in the bag main body 60.

Besides, when the retention rod 116 moves out of the latch ring 136 as the micro gas generator 124 of the tether retention device 100 activates, the retention rod 116 also moves out of the latch ring 192. Therefore, in this state, the retention of the tethers 88, 190 by the retention rod 116 is discontinued. As the bag body 182 is inflated from this state, the internal pressure of the bag body 182 pushes the tube vent 84 from the hole portion 82, and also pushes the dummy tube vent 186 from the hole portion 184. As a result, as the base end of the tube vent 84 shifts to the outside of the bag main body 60 through the hole portion 82, the base end of the tube vent 84 turns inside out. Besides, as the base end of the dummy tube vent 186 shifts to the outside of the bag main body 60 through the hole portion 184, the base end of the dummy tube vent 186 turns inside out.

Figure 11:
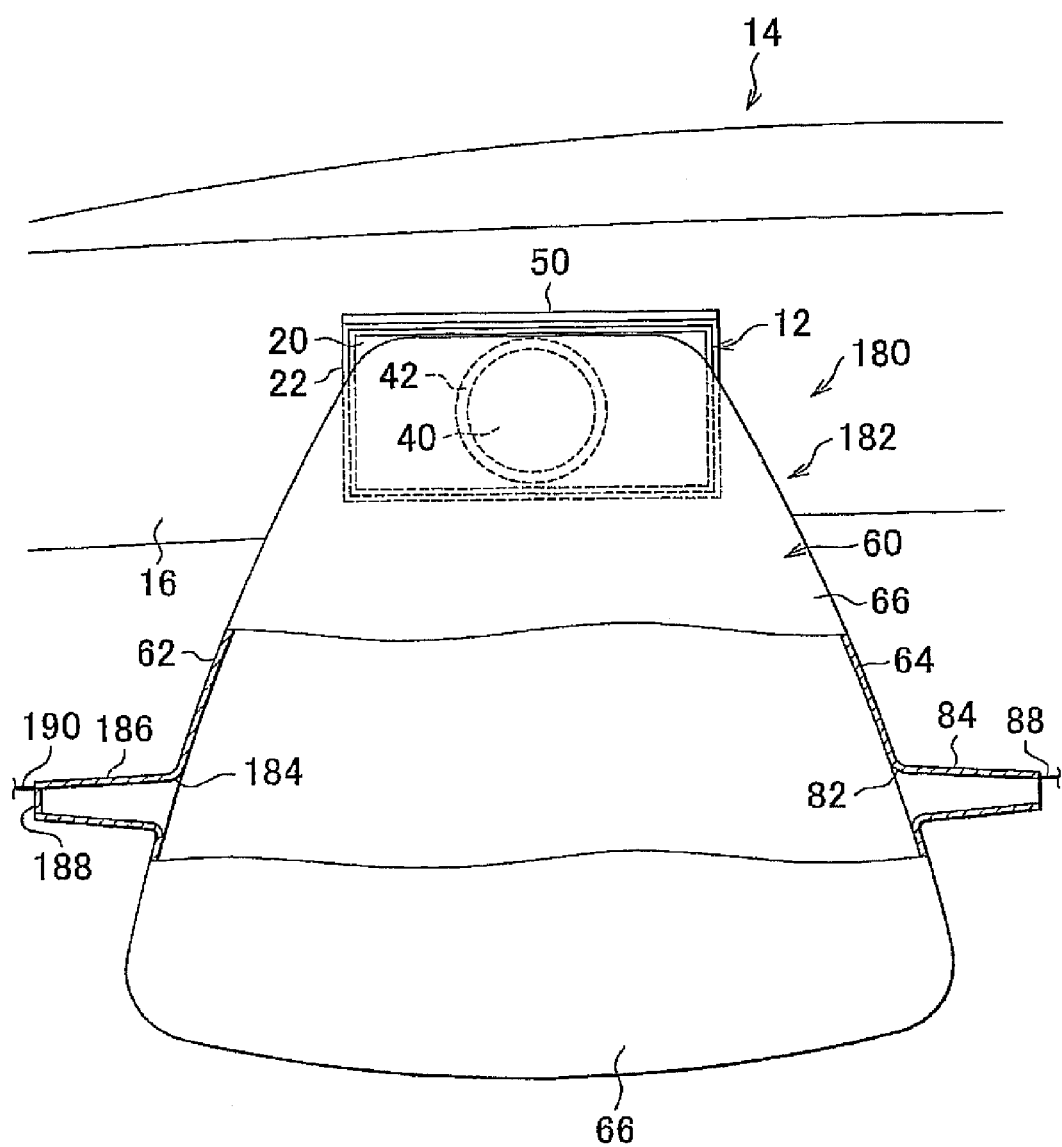
FIG. 11 is a plan view corresponding to FIG. 4, showing a state in which the retention of the distal end of the tube vent has discontinued and the tube vent has stretched out to the outside of the bag body.

In this manner, the cylindrical portions of the tube vent 84 and the dummy tube vent 186 entirely stretch straight out to the outside of the bag main body 60 as shown in FIG. 11 through the progressive inside-out turning of the tube vent 84 and the dummy tube vent 186 which starts from the base end of each vent. In this state, while gas in the bag body 182 is released from the hole portion 82 through the tube vent 84, gas is not released from the dummy tube vent 186 since the distal end of the dummy tube vent 186 is closed.

Thus, although gas is not released from the dummy tube vent 186, the cylindrical portion of the dummy tube vent 186 stretches straight out to the outward side in the vehicle width direction while the cylindrical portion of the tube vent 84 stretches straight out to the inward side in the vehicle width direction. Therefore, the left-right balance improves, so that the left-right oscillation of the bag body 182 can be prevented or effectively restrained. Besides, the shape of the dummy tube vent 186 viewed from a direction orthogonal to the lengthwise direction of the dummy tube vent 186 is the same as the shape of the tube vent 84 viewed from such a direction. The opening shape of the hole portion 184 to which the base end portion of the dummy tube vent 186 connects is the same as that of the hole portion 82. Furthermore, the position at which the hole portion 184 is formed is defined so as to face, in the vehicle width direction, the position at which the hole portion 82 is formed, when the airbag device 180 is deployed. Specifically, the dummy tube vent 186 and the tube vent 84, in a plan view, are left-right symmetric (line symmetric) about an axis in the longitudinal direction of the vehicle 14. As a result, the left-right balance further improves, so that the left-right oscillation of the bag body 182 can be prevented or effectively restrained.

Construction of Third Embodiment

Next, a third embodiment of the invention will be described.

Figure 13:
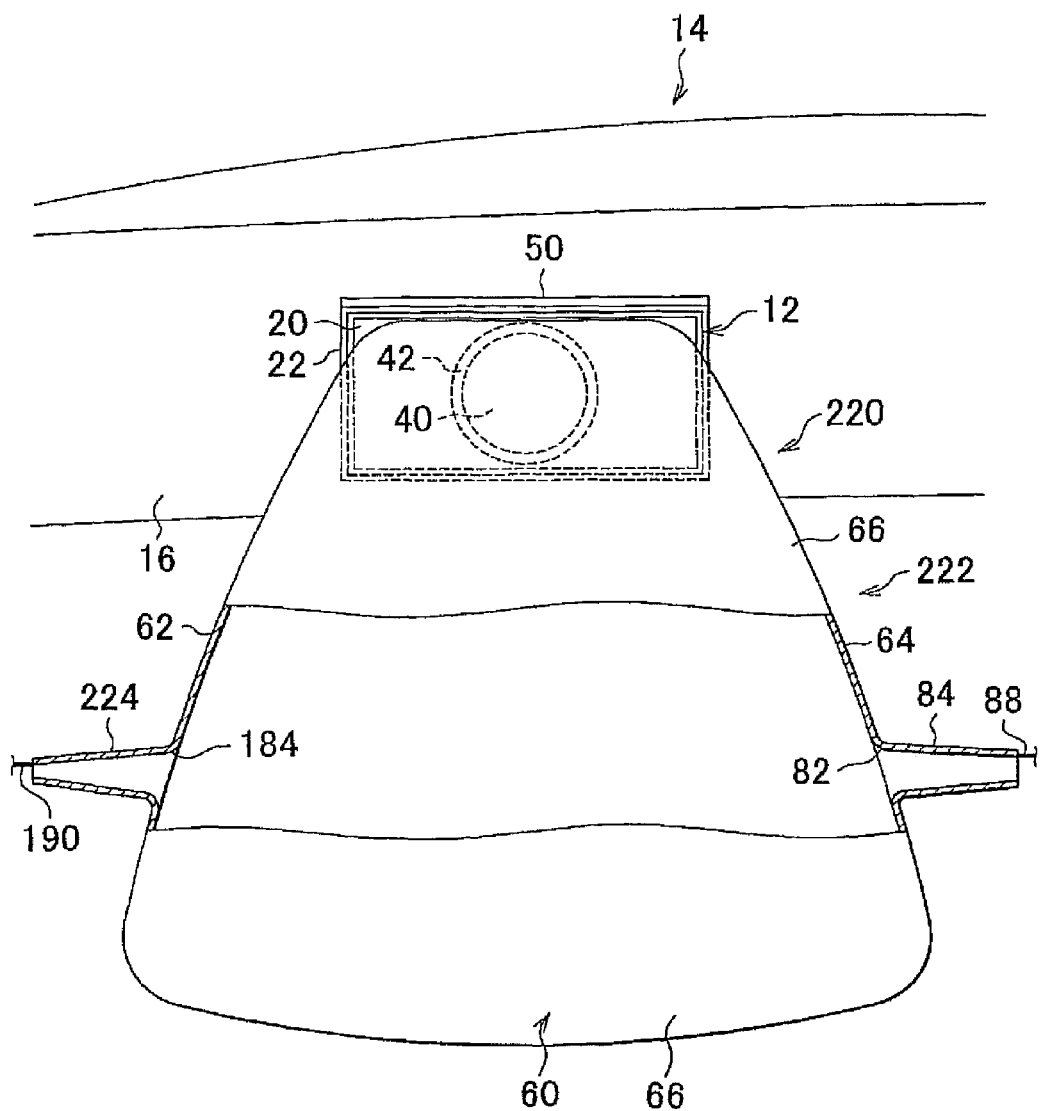
FIG. 13 is a plan view of an airbag device in accordance with a third embodiment of the invention, showing a state in which the retention of the distal end of a tube vent has discontinued and the tube vent has stretched out to the outside of a bag body, corresponding to FIG. 4.

FIG. 13 shows portion of a construction of an airbag device 220 in accordance with this embodiment in a plan view corresponding to the drawing in FIG. 4 that illustrates the airbag device 180 in accordance with the second embodiment.

As shown in FIG. 13, the airbag device 220 is not equipped with the bag body 182, but is equipped with a bag body 222 instead. A side base cloth 62 that is positioned outward in the vehicle width direction and that constitutes the bag body 222 is not provided with the dummy tube vent 186, but is provided with a tube vent 224 instead. Unlike the dummy tube vent 186 of the second embodiment, the tube vent 224 is open at its distal end portion. However, the opening area of the tube vent 224 is sufficiently smaller than the opening area of the distal end of the tube vent 84. Therefore, the tube vent 224 causes sufficiently larger resistance on gas passing through the inside thereof than the tube vent 84.

Operation and Effects of Third Embodiment

In the airbag device 220, when both the tube vent 84 and the tube vent 224 stretch straight out to the outside of the bag body 222 during the deployed state of the bag body 222, gas is released from both the tube vent 84 and the tube vent 224. However, since the opening area of the distal end of the tube vent 224 is sufficiently smaller than the opening area of the distal end of the tube vent 84, the tube vent 224 causes greater resistance on the gas passing therethrough than the tube vent 84.

Hence, the amount of gas released per unit time is sufficiently larger through the tube vent 84 than through the tube vent 224. Therefore, even if the tube vent 224 is closed so that gas cannot be released therefrom, due to, for example, a bent of an intermediate portion of the tube vent 224, gas can be sufficiently released through the tube vent 84, and therefore the influence of the closure of the tube vent 224 is small.

Furthermore, if gas can be released also from the tube vent 224 without a bent of an intermediate portion of the tube vent 224 or the like, the release of gas through both the tube vent 84 and the tube vent 224 achieves good left-right balance; that is, the release of gas through the tube vent 224 can cancel out the swing of the bag body 222 to a side opposite from the tube vent 84 in the width direction which is caused by the release of gas through the tube vent 84. Therefore, the left-right balance of the bag body 222 can be effectively improved, and the left-right oscillation of the bag body 222 can be very effectively restrained or prevented.

Construction of Fourth Embodiment

Next, a fourth embodiment of the invention will be described.

Figure 14:
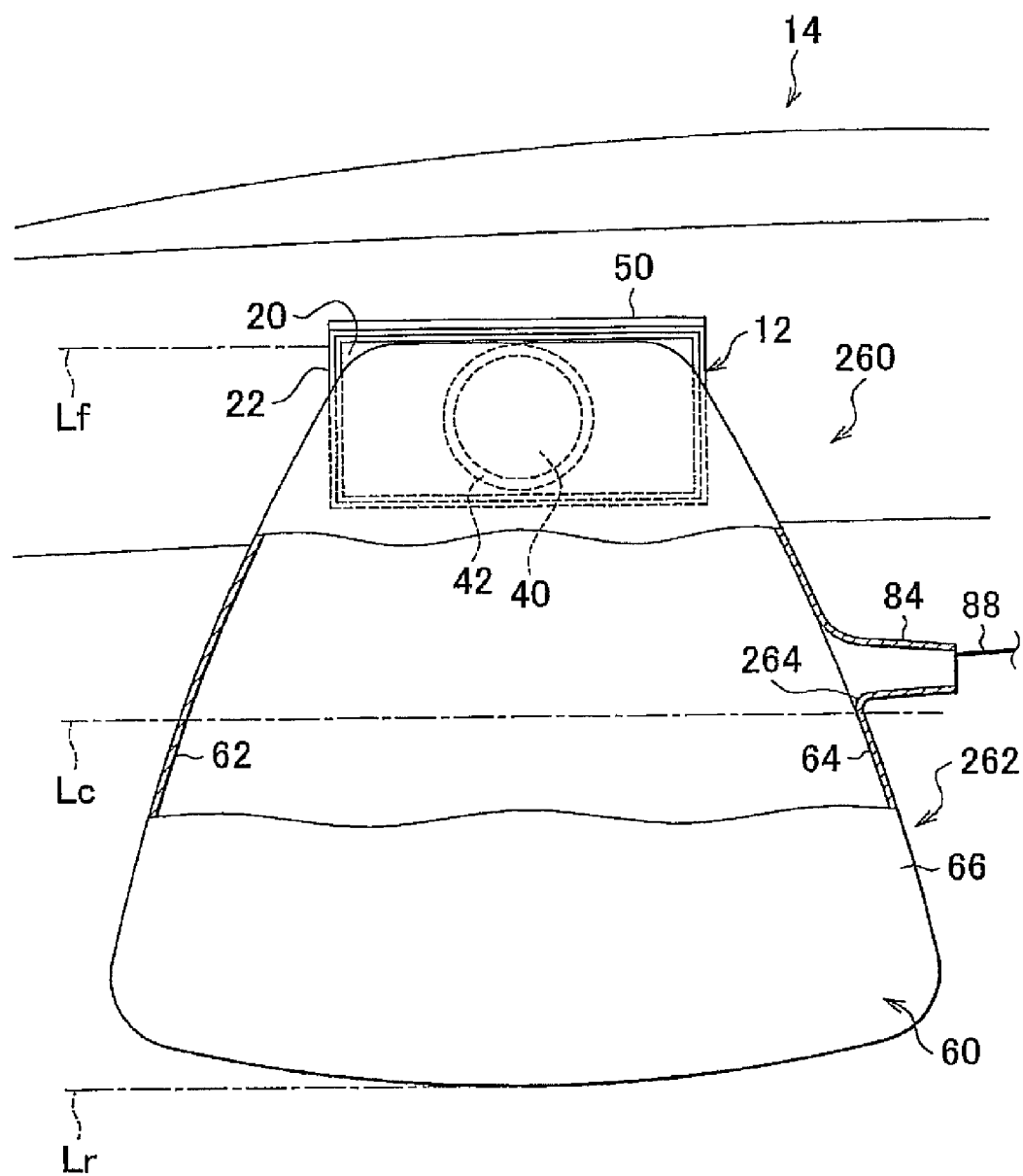
FIG. 14 is a plan view of an airbag device in accordance with a fourth embodiment of the invention, showing a state in which the retention of the distal end of a tube vent has discontinued and the tube vent has stretched out to the outside of a bag body, corresponding to FIG. 4.

FIG. 14 shows portions of a construction of an airbag device 260 in accordance with this embodiment in a plan view corresponding to the drawing in FIG. 4 that illustrates the airbag device 10 in accordance with the first embodiment. Besides, FIG. 15 shows an overall construction of the airbag device 260 in a schematic side view.

As shown in FIG. 14, the airbag device 260 is not equipped with the bag body 30, but is equipped with a bag body 262. A side base cloth 64 that is positioned inward in the vehicle width direction and that constitutes the bag body 262 does not have the hole portion 82, but has a hole portion 264 instead. A base end portion of the tube vent 84 is connected to the side base cloth 64 of the bag body 262, corresponding to a peripheral edge of the hole portion 264. That is, only the side base cloth 64 positioned inward in the vehicle width direction is provided with the hole portion 264 and the tube vent 84, but the side base cloth 62 positioned outward in the vehicle width direction is not provided with a hole portion nor with a tube vent.

Figure 15:
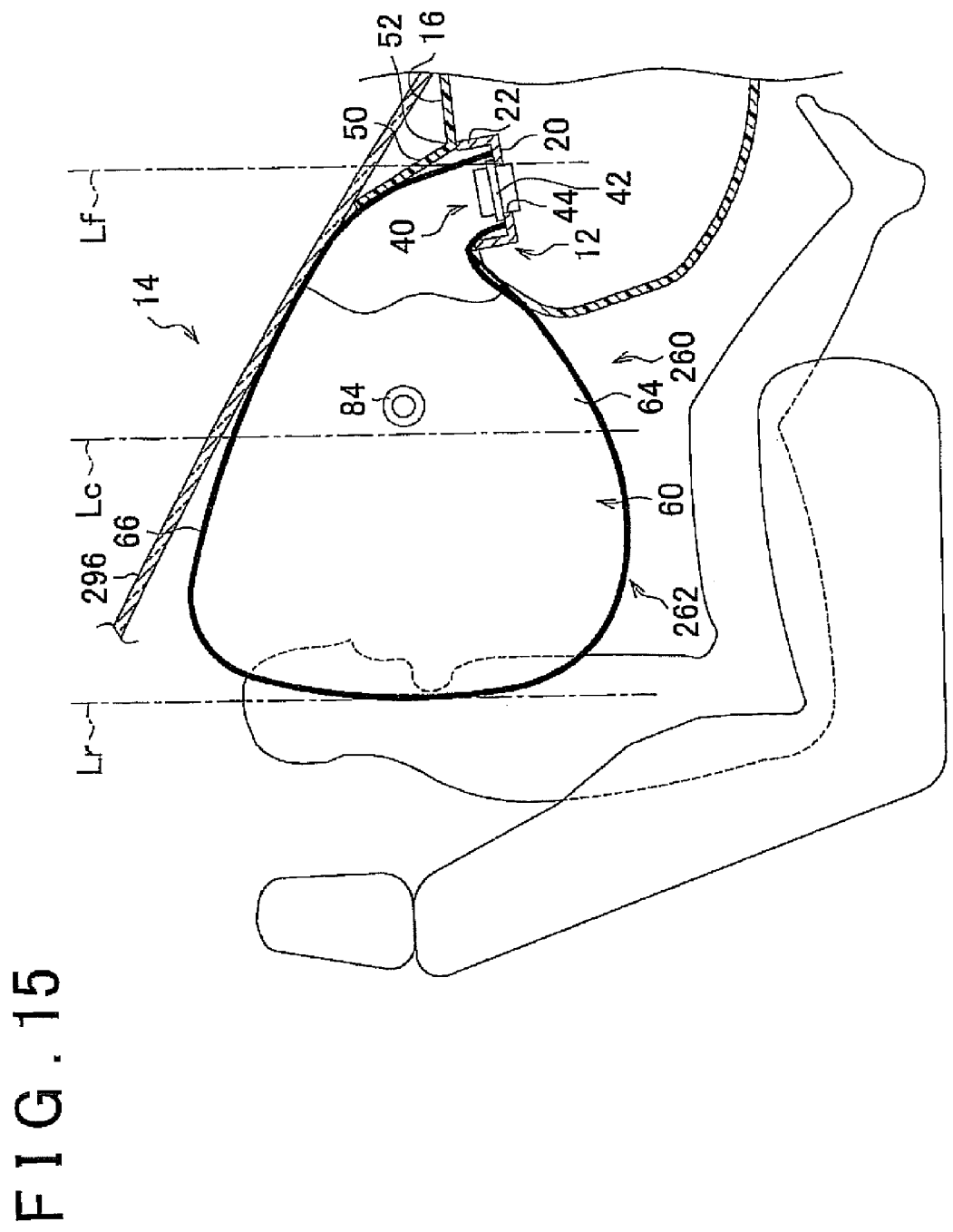
FIG. 15 is a schematic side view showing an overall construction of the airbag device in accordance with the fourth embodiment of the invention.

Herein, a dashed one-dotted line Lr shown in FIGS. 14 and 15 shows a position of a rear end portion of the bag body 262 substantially in the vehicle longitudinal direction in the deployed state of the bag body 262 (which will hereinafter will be referred to as "the rear end portion of the bag body 262 in the deployed state" for convenience sake. On another hand, a dashed one-dotted line Lf shown in FIGS. 14 and 15 shows a position of a front end portion of a portion of the bag body 262 in the deployed state that is positioned inside the cabin of the vehicle 14 (i.e., a portion of the bag body 262 that is positioned at the cabin-side of the rectangular hole portion that is formed in the instrument panel 16 when the airbag door 50 is deployed) (which will hereinafter be referred to as "the front end portion of the bag body 262 in the deployed state" for convenience sake). Furthermore, a dashed one-dotted line Lc shown in FIGS. 14 and 15 shows a central portion of the bag body 262 in the deployed state that is between the front end portion and the rear end portion of the deployed bag body 262 in the vehicle longitudinal direction (which will hereinafter be referred to as "the central portion of the bag body 262 in the deployed state" for convenience sake).

As shown in FIGS. 14 and 15, in the airbag device 260, the hole portion 264 is formed at the position that is in front of the central portion Lc of the bag body 262 and the base end portion of the tube vent 84 is connected to the edge of the hole portion 264 in such a manner that during the deployed state of the bag body 262, the tube vent 84 is positioned at the position that is in front of the central portion Lc of the bag body 262 in the deployed state. Besides, the shape and the like of the tube vent 84 are set so that the tube vent 84 stretches straight outward from the bag body 262, and so that the entire cylindrical portion of the tube vent 84 stretched in the lengthwise direction is positioned at the position that is in front of the central portion Lc of the bag body 262. Particularly, in this airbag device 260, the hole portion 264 is formed at the position that is in front of the central portion Lc of the bag body 262 in the deployed state.

Operation and Effects of Fourth Embodiment

In the airbag device 260 characterized by the construction as described above, the tube vent 84 is near the oscillation center when the bag body 262 tends to oscillate to left and right. Therefore, although gas is released from the tube vent 84 that is provided corresponding to the hole portion 264, the bag body 262 does not easily oscillate to left and right, unless the momentum of gas is strong. Therefore, the left-right balance of the bag body 262 can be effectively improved, and the left-right oscillation of the bag body 262 can be very effectively restrained or prevented.

Construction of Fifth Embodiment

A fifth embodiment of the invention will be described.

Figure 16:
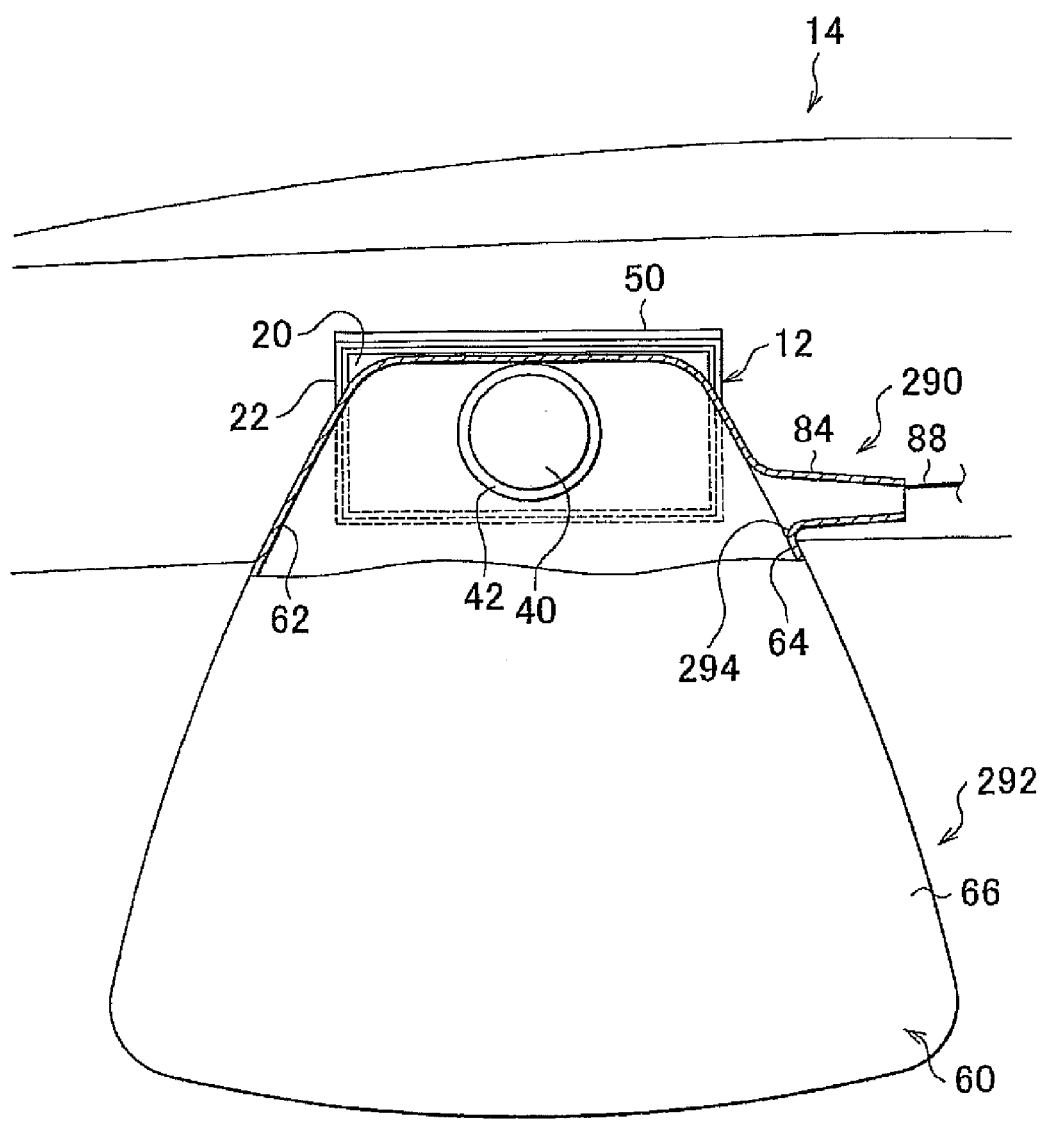
FIG. 16 is a plan view of an airbag device in accordance with a fifth embodiment of the invention, showing a state in which the retention of the distal end of a tube vent has discontinued and the tube vent has stretched out to the outside of a bag body, corresponding to FIG. 4.

FIG. 16 shows portion of a construction of the airbag device 290 in a plan view corresponding to the drawing in FIG. 4 that illustrates the airbag device 10 in accordance with the first embodiment. Besides, FIG. 17 shows an overall construction of the airbag device 290 in a schematic side view.

As shown in these drawings, the airbag device 290 is not equipped with the bag body 30, but is equipped with a bag body 292 instead. A side base cloth 64 that constitutes the bag body 292 does not have the hole portion 82, but has a hole portion 294 instead. A base end portion of a tube vent 84 is connected to the side base cloth 64 of the bag body 292, corresponding to a peripheral edge of the hole portion 294. That is, only the side base cloth 64 positioned inward in the vehicle width direction is provided with the hole portion 294 and the tube vent 84, but a side base cloth 62 positioned outward in the vehicle width direction is not provided with a hole portion nor with a tube vent.

Figure 17:
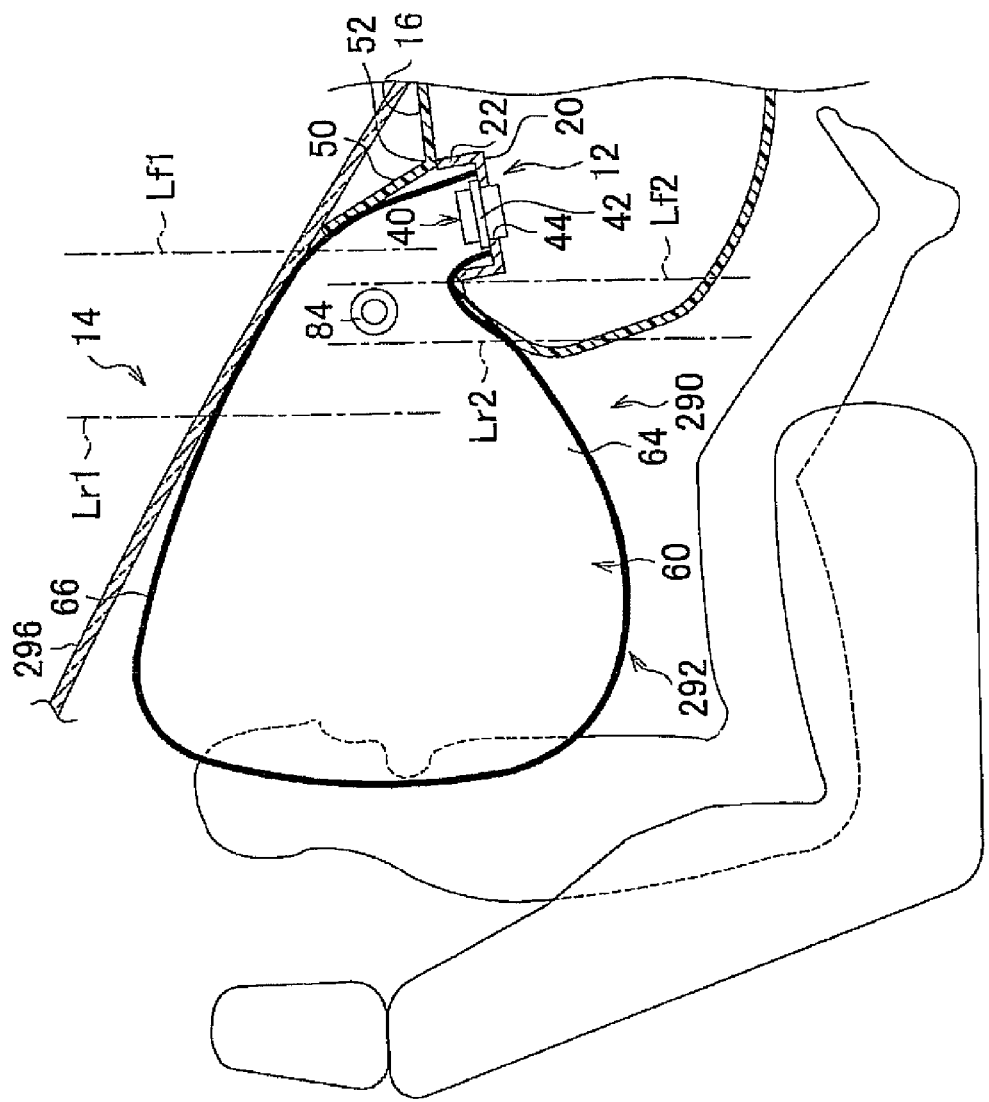
FIG. 17 is a schematic side view showing an overall construction of the airbag device in accordance with the fifth embodiment of the invention.

It is to be noted herein that a dashed one-dotted line Lr1 shown in FIG. 17 shows a rear end portion (a first rear end portion) of a range of contact between the bag body 292 in the deployed state and a windshield pane 296 of the vehicle 14, while a dashed one-dotted line Lf1 shows a position of a front end portion (a first front end portion) of the range of contact between the bag body 292 in the deployed state and the windshield pane 296 of the vehicle 14. On another hand, a dashed one-dotted line Lr2 shown in FIG. 17 shows a position of a rear end portion (a second rear end portion) of a range of contact between the bag body 292 in the deployed state and an instrument panel 16, while a dashed one-dotted line Lf2 shows a position of a front end portion (a second front end portion) of the range of contact between the bag body 292 in the deployed state and the instrument panel 16.

In the airbag device 290, during the deployed state of the bag body 292, the position Lr1 of the first rear end portion of the range of contact between the bag body 292 and the windshield pane 296 is closer to the rear of the vehicle than the position Lr2 of the second rear end portion of the range of contact between the bag body 292 and the instrument panel 16. Besides, the position Lf1 of the first front end portion of the range of contact between the bag body 292 and the windshield pane 296 is closer to the front of the vehicle than the position Lf2 of the second front end portion of the range of contact between the bag body 292 and the instrument panel 16. That is, in the airbag device 290, the range of contact between the bag body 292 and the instrument panel 16 in the vehicle longitudinal direction is contained within the range of contact between the bag body 292 and the windshield pane 296 in the vehicle longitudinal direction, in a vehicle side view of the bag body 292 in the deployed state.

It is to be noted herein that in the airbag device 290, the position of formation of the hole portion 294 and the shape of the tube vent 84 are set so that, when the tube vent 84 has stretched into the outside of the bag body 292, the position of the tube vent 84 is within the range of contact between the bag body 292 and the windshield pane 296 and within the range of contact between the bag body 292 and the instrument panel 16. Particularly, in the airbag device 290, the position of formation of the hole portion 294 is set so as to be within the range of contact between the bag body 292 and the windshield pane 296 and within the range of contact between the bag body 292 and the instrument panel 16.

Operation and Effects of Fifth Embodiment

As gas is released from the tube vent 84, the bag body 292 in the deployed state tends to oscillate substantially in the left and right directions relative to the vehicle, about an axis substantially in the up-down direction relative to the vehicle.

With regard to the oscillation of the bag body 292, the friction resistance at the contact portions of the bag body 292 and the instrument panel 16 tends to restrain the oscillation of the bag body 292 substantially in the left-right direction relative to the vehicle. If during a state in which the tube vent 84 has stretched to the outside of the bag body 292, the tube vent 84 is positioned at a site that is rear of the range of contact between the bag body 292 and the instrument panel 16, that is, if the tube vent 84 is disposed with a distance rearward in the vehicle longitudinal direction from the rear end of the range of contact, the distance between the tube vent 84 and the rear end of the range of contact becomes large (i.e., the moment arm length increases), and the bag body 292 is likely to oscillate in the left-right direction, at a site that is rearward of the range of contact between the bag body 292 and the instrument panel 16.

Herein, in the airbag device 290, since the tube vent 84 is positioned within the range of contact between the bag body 292 and the instrument panel 16 when the tube vent 84 has stretched to the outside of the bag body 292, the oscillation of the bag body 292 is reduced or prevented by the friction between the bag body 292 and the instrument panel 16. Furthermore, since the oscillation of the bag body 292 caused by the release of gas from the tube vent 84 of the bag body 292 is reduced or prevented in the range of contact and the bag body 292 and the instrument panel 16, the influence of the release of gas from the tube vent 84 in terms of the oscillation does not easily reach the site that is in rear of the range of contact between the bag body 292 and the instrument panel 16. Therefore, the oscillation of the bag body 292 at the site thereof rearward of the range of contact between the bag body 292 and the instrument panel 16 can be effectively reduced or prevented.

Furthermore, in the airbag device 290, since the bag body 292 in the deployed state is in contact with the windshield pane 296, the friction between the bag body 292 and the windshield pane 296 also restrains the oscillation of the bag body 292 substantially in the left-right direction of the vehicle. It is to be noted herein that in the airbag device 290, the range of contact between the bag body 292 and the instrument panel 16 in the vehicle longitudinal direction is contained in the range of contact between the bag body 292 and the windshield pane 296 in the vehicle longitudinal direction, in a vehicle side view of the bag body 292 in the deployed state.

Hence, the tube vent 84 positioned within the range of contact between the bag body 292 and the instrument panel 16 is naturally positioned within the range of contact between the bag body 292 and the windshield pane 296. Therefore, since not only the friction between the bag body 292 and the instrument panel 16 but also the friction between the bag body 292 and the windshield pane 296 reduces or prevents the oscillation of the bag body 292, the oscillation of the bag body 292 can be even more effectively reduced or prevented.

This embodiment has a construction in which the position of formation of the hole portion 294 is set so as to be within the range of contact between the bag body 292 and the instrument panel 16. However, it basically suffices that the position of formation of the hole portion 294 be set at a site that is in front of the second rear end portion of the range of contact between the bag body 292 and the instrument panel 16.

That is, in the case where the position of formation of the hole portion 294 is at the site that is in front of the second front end portion of the range of contact between the bag body 292 and the instrument panel 16, the position of formation of the hole portion 294 is outside the range of contact between the bag body 292 and the instrument panel 16. However, even in the case of this construction, it remains that the foregoing friction works against the oscillation of the bag body 292 that is caused by the release of gas from the tube vent 84, and it also remains that the oscillation of the bag body 292 at the site that is rearward of the range of contact between the bag body 292 and the instrument panel 16 is effectively reduced or prevented.

Besides, this embodiment has a construction in which the range of contact between the bag body 292 and the instrument panel 16 in the vehicle longitudinal direction is contained in the range of contact between the bag body 292 and the windshield pane 296 in the vehicle longitudinal direction, in a vehicle side view of the bag body 292 in the deployed state. However, depending on the slope of the windshield pane 296, the shape of the instrument panel 16, and the deployed shape of the bag body 292, there are cases where, in a vehicle side view of the bag body 292 in the deployed state, the range of contact between the bag body 292 and the instrument panel 16 in the vehicle longitudinal direction is not contained in the range of contact between the bag body 292 and the windshield pane 296 in the vehicle longitudinal direction, but where a portion or the whole of the range of contact between the bag body 292 and the windshield pane 296 deviates forward or rearward from the range of contact between the bag body 292 and the instrument panel 16.

Even in such a construction, if the position of formation of the hole portion 294 is set at the site that is in front of one of the rear end portions (the first rear end portion and the second rear end portion) of the range of contact between the bag body 292 and the windshield pane 296 and between the rear end portion of the range of contact between the bag body 292 and the instrument panel 16, and which is located closer to the front of the vehicle than other of two end portions, it is possible to achieve the effect of restraining the left-right oscillation of the bag body 292 by the friction resistance caused by the contact with the windshield pane 296 and the contact with the instrument panel 16 as in the foregoing embodiment.

Furthermore, the embodiment has a construction in which the hole portion 294 is formed at such a position as to be positioned in front of the position of the first rear end portion of the range of contact between the bag body 292 and the windshield pane 296, and also in front of the second rear end portion of the range of contact between the bag body 292 and the instrument panel 16, during the deployed state of the bag body 292. However, since the friction at the contact portion of the bag body 292 and the windshield pane 296 also works against the oscillation of the bag body 292 as described above, the position of formation of the hole portion 294 may also be shifted rearward. For example, even in the case where the position of formation of the hole portion 294 is set at the site that is in rear of the second rear end portion of the range of contact between the bag body 292 and the instrument panel 16, substantially the same effect as that of the foregoing embodiments can be achieved by the friction between the bag body 292 and the windshield pane 296 despite some reduction in the effect of the friction between the bag body 292 and the instrument panel 16, provided that the position of formation of the hole portion 294 is in front of the first rear end portion of the range of contact between the bag body 292 and the windshield pane 296.

Besides, this embodiment has a construction in which the position of formation of the hole portion 294 is set at the site that is in front of one of the rear end portions of the range of contact between the bag body 292 and the windshield pane 296 and between the bag body 292 and the instrument panel 16. One of the rear end portions is the second rear end portion of the range of contact between the bag body 292 and the instrument panel 16 which is positioned in front of other of the rear end portions as the second rear end portion. However, in this embodiment, it suffices that, due to the friction between the bag body 292 and the instrument panel 16 or the windshield pane 296, the influence that the gas released from the tube vent 84 has on the bag body 292 at the site that is rearward of the range of contact between the bag body 292 and the instrument panel 16 or the windshield pane 296 can be reduced, and thus the oscillation of the bag body 292 can be substantially prevented.

Therefore, in light of this, it is not necessary that strictly the entire hole portion 294 be positioned at the site that is in front of the rear end portion of the range of contact between the bag body 292 and the instrument panel 16 or the windshield pane 296. For example, it is also permissible to adopt a construction in which only a front part of the internal edge of the hole portion 294 that is positioned forward in the vehicle longitudinal direction is positioned at the site that is in front of the rear end portion of the range of contact between the bag body 292 and the instrument panel 16 or the windshield pane 296, and in which the other portion of the hole portion 294 (an rear internal edge portion thereof positioned rearward of the rear end portion of the range of contact between the bag body 292 and the instrument panel 16 or the windshield pane 296) is positioned at the site that is in rear of the rear end portion of the range of contact between the bag body 292 and the instrument panel 16 or the windshield pane 296.

What is claimed is:

1. An airbag device comprising:
    a bag body that is deployed by internal pressure rising as a gas is supplied into the bag body;
    a gas pressure adjustment portion that is provided on the bag body so as to be able to release the gas from an inside of the bag body only to an inward side in a vehicle width direction during a deployed state of the bag body, the gas pressure adjustment portion includes a first cylindrical tube vent having a base end portion connected to an edge of a hole portion that is formed in a side portion of the bag body that faces inward in the vehicle width direction during the deployed state of the bag body, and which is able to release the gas from the inside of the bag body when a distal end of the first tube vent stretches out to the outside of the bag body;
    a tether having a base end portion and a distal end portion, the base end portion being latched to the distal end of the first tube vent; and
    a tether retention device which holds the distal end portion of the tether;
    wherein the tether retention device holds the first tube vent in a state where the distal end portion of the tether extends inside the bag body and discontinues a retention of the distal end portion of the tether when the bag body is in the deployed state and wherein the first tube vent stretches out to the outside of the bag body when the retention is discontinued.

2. The airbag device according to claim 1, wherein the gas pressure adjustment portion further includes:
    a second tube vent having a base end portion connected to an edge of a hole portion that is formed in a side portion of the bag body that faces outward in the vehicle width direction during the deployed state of the bag body, and a closed distal end portion which stretches out to the outside of the bag body as the internal pressure rises.

3. The airbag device according to claim 1, wherein the first tube vent and the second tube vent are provided at a left-right symmetric position about an axis in the vehicle longitudinal direction in the deployed state of the bag body.

4. The airbag device according to claim 1, wherein a cylindrical portion of the first tube vent and a cylindrical portion of the second tube vent have the same shape.

5. The airbag device according to claim 1, wherein the first tube vent is provided at a position on the bag body that is in front of a central portion of the bag body in a vehicle longitudinal direction, within a portion of the bag body between a rear end portion of the deployed bag body and a front end portion of a portion of the deployed bag body that is positioned in a cabin of the vehicle.

6. The airbag device according to claim 1, wherein at least a portion of the first tube vent is positioned at a site that is in front of one of a first rear end portion of a range of contact between the deployed bag body and a windshield pane of the vehicle and a second rear end portion of a range of contact between deployed bag body and an instrument panel of the vehicle, the one of the first and second rear end portions being closer to the rear of the vehicle than other of the first and second rear end portions.

7. The airbag device according to claim 1, wherein the first tube vent is provided so that at least the portion of the tube vent is positioned in front of the one of the first and second rear end portions that is closer to the front of the vehicle than the other of the first and second rear end portions.

8. The airbag device according to claim 7, wherein the first tube vent is provided so that at least a part of the base end portion is positioned in front of the one of the first and second rear end portions that is closer to the rear of the vehicle than the other of the first and second rear end portions.

9. The airbag device according to claim 8, wherein the first tube vent is provided so that at least the part of the base end portion is positioned in front of the one of the first and second rear end portions that is closer to the front of the vehicle than the other of the first and second rear end portions.

10. The airbag device according to claim 5, wherein the base end portion of the first tube vent is connected to the bag body, at the position on the bag body that is in front of the central portion of the bag body in the vehicle longitudinal direction, within the portion of the bag body between the rear end portion of the deployed bag body and the front end portion of the portion of the deployed bag body that is positioned in the cabin of the vehicle.

11. The airbag device according to claim 10, wherein a whole of the first tube vent that includes a cylindrical portion of the first tube vent in a state in which the first tube vent stretches straight out to the outside of the bag body, and that is positioned in front of the central portion of the bag body in the vehicle longitudinal direction, within the portion of the bag body between the rear end portion of the deployed bag body and the front end portion of the portion of the deployed bag body that is positioned in the cabin of the vehicle.

* * * * *